United States Patent
Waldspurger et al.

(10) Patent No.: US 12,107,879 B2
(45) Date of Patent: Oct. 1, 2024

(54) DETERMINING DATA RISK AND MANAGING PERMISSIONS IN COMPUTING ENVIRONMENTS

(71) Applicant: Microsoft Technology Licensing, LLC, Redmond, WA (US)

(72) Inventors: Carl Alan Waldspurger, Palo Alto, CA (US); Shaun Robert Applegate-Swanson, Austin, TX (US); Venkata Adusumilli, Cupertino, CA (US); Balaji Parimi, Sunnyvale, CA (US); Naga Venkata Naveen Teja Jangalapalli, Santa Clara, CA (US); Nicholas James Barretta, Toronto (CA); Guruprasad Ramprakash, San Jose, CA (US); Parag Mahendrakumar Bajaria, Cupertino, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 283 days.

(21) Appl. No.: 17/587,437

(22) Filed: Jan. 28, 2022

(65) Prior Publication Data
US 2022/0263851 A1 Aug. 18, 2022

Related U.S. Application Data

(60) Provisional application No. 63/150,348, filed on Feb. 17, 2021.

(51) Int. Cl.
*H04L 29/00* (2006.01)
*H04L 9/40* (2022.01)

(52) U.S. Cl.
CPC ........ *H04L 63/1433* (2013.01); *H04L 63/101* (2013.01); *H04L 63/102* (2013.01); *H04L 63/205* (2013.01)

(58) Field of Classification Search
CPC . H04L 63/1433; H04L 63/101; H04L 63/102; H04L 63/205
See application file for complete search history.

(56) References Cited

U.S. PATENT DOCUMENTS

| 9,325,728 B1* | 4/2016 | Kennedy | H04L 63/1433 |
| 11,277,429 B2* | 3/2022 | Ababtain | H04L 63/1425 |
| 11,411,980 B2* | 8/2022 | Triantafillos | H04L 67/535 |

(Continued)

OTHER PUBLICATIONS

"International Search Report and Written Opinion Issued in PCT Application No. PCT/US22/015675", Mailed Date: May 3, 2022, 12 Pages.

*Primary Examiner* — Don G Zhao
(74) *Attorney, Agent, or Firm* — Weaver IP L.L.C.

(57) ABSTRACT

Methods, systems, apparatuses, and computer-readable storage mediums are described for assigning a security risk score to a resource. In one example, resource access data is collected for a resource. Based at least on the resource access data, a data risk index (DRI) score is generated for the resource. The DRI score comprises a value that is indicative of a level of risk that the resource will be compromised. At least one of the DRI score, an alert based at least on the DRI score, or a policy change for the resource based at least on the generated DRI score is reported to an administrator.

20 Claims, 7 Drawing Sheets

(56) References Cited

U.S. PATENT DOCUMENTS

| | | | | |
|---|---|---|---|---|
| 11,444,969 | B2* | 9/2022 | Chesla | H04L 63/1433 |
| 11,537,706 | B1* | 12/2022 | Sharifi Mehr | G06F 21/33 |
| 11,563,764 | B1* | 1/2023 | Hoscheit | H04L 63/1433 |
| 11,606,370 | B1* | 3/2023 | Comeaux | G06N 7/01 |
| 11,757,914 | B1* | 9/2023 | Jakobsson | H04L 51/212 |
| | | | | 726/25 |
| 2013/0086054 | A1* | 4/2013 | Wang | G06F 16/1767 |
| | | | | 707/E17.008 |
| 2014/0189098 | A1* | 7/2014 | MaGill | H04L 63/104 |
| | | | | 709/224 |
| 2016/0065608 | A1* | 3/2016 | Futty | H04L 63/1433 |
| | | | | 726/25 |
| 2017/0171231 | A1* | 6/2017 | Reybok, Jr. | H04L 63/02 |
| 2017/0331840 | A1 | 11/2017 | Ranjan | |
| 2018/0152471 | A1* | 5/2018 | Jakobsson | H04L 63/1425 |
| 2018/0324197 | A1* | 11/2018 | Zettel, II | H04L 63/1425 |
| 2018/0375891 | A1 | 12/2018 | Juncker et al. | |
| 2020/0042837 | A1* | 2/2020 | Skinner | G06F 18/217 |
| 2020/0162498 | A1* | 5/2020 | Ababtain | H04L 63/1416 |
| 2020/0286016 | A1 | 9/2020 | Singh et al. | |
| 2020/0322369 | A1* | 10/2020 | Raghuramu | H04L 63/102 |
| 2020/0351655 | A1* | 11/2020 | Sunkavally | H04L 63/205 |
| 2021/0021612 | A1* | 1/2021 | Higbee | H04L 63/1491 |
| 2021/0194896 | A1* | 6/2021 | Seymour | G06F 11/3072 |
| 2021/0266340 | A1* | 8/2021 | Grounds | H04L 63/1433 |
| 2021/0400066 | A1* | 12/2021 | Sood | H04L 63/1425 |
| 2022/0086131 | A1* | 3/2022 | Kinai | G06N 20/00 |
| 2022/0198054 | A1* | 6/2022 | Picos | G06F 21/6245 |
| 2022/0217169 | A1* | 7/2022 | Varanda | H04L 63/1425 |
| 2022/0345469 | A1* | 10/2022 | Domagalski | H04L 63/0236 |
| 2023/0421579 | A1* | 12/2023 | Thomas | H04L 63/1416 |

* cited by examiner

400

┌─────────────────────────────────────────────────────────┐
│ Receive a weight associated with at least one of the resource, an identity │ 402
│ permitted to access the resource, or an action that can be performed on the │
│                          resource                        │
└─────────────────────────────────────────────────────────┘
                              │
                              ▼
┌─────────────────────────────────────────────────────────┐
│ Generate the DRI score for the resource based at least on the resource access │ 404
│                      data and the weight                 │
└─────────────────────────────────────────────────────────┘

┌─────────────────────────────────────────────────────────┐
│ Generate a plurality of DRI scores, each DRI score corresponding to a different │ 502
│           resource of an organization or perspective on risk              │
└─────────────────────────────────────────────────────────┘
                              │
                              ▼
┌─────────────────────────────────────────────────────────┐
│ Aggregate the plurality of DRI scores to generate an aggregated DRI score │ 504
└─────────────────────────────────────────────────────────┘
                              │
                              ▼
┌─────────────────────────────────────────────────────────┐
│         Provide the aggregated DRI score to the administrator              │ 506
└─────────────────────────────────────────────────────────┘

FIG. 5

DETERMINING DATA RISK AND MANAGING PERMISSIONS IN COMPUTING ENVIRONMENTS

CROSS-REFERENCE TO RELATED APPLICATIONS

This application claims the benefit of U.S. Provisional Application No. 63/150,348, filed Feb. 17, 2021, titled "Determining Data Risk and Managing Permissions in Computing Environments," the entirety of which is incorporated by reference herein.

BACKGROUND

More and more, enterprises and other groups of users are turning to platforms such as Amazon Web Service® (AWS), Microsoft Azure™, and Google Cloud Platform™ (GCP) not only for storage, but also for other services such as hosting, building, testing, deploying and running applications. At the same time, the types and complexity of accessible resources are increasing and include, for example, the Relational Database Server (RDS) and the file storage service Glacier® provided by Amazon, the SQL Server® provided by Microsoft, and many others. A resource can include any software or hardware (or combination) in a computing environment intended for storage, transmission, and/or processing of information.

Permissions are typically granted to an identity to perform an action on a resource. An identity can include an entity that is in control of a computer, either by a human or by an automated service (e.g., a bot) that has the ability to request access to a resource. Each identity that is granted permissions to perform actions on a shared resource adds some incremental risk such as unauthorized data access, data corruption due to improper behavior or compromise, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for assigning a security risk score to a resource. In one example, resource access data is collected for a resource. Based at least on the resource access data, a data risk index (DRI) score is generated for the resource. The DRI score comprises a value that is indicative of a level of risk that the resource will be compromised. At least one of the DRI score, an alert based at least on the DRI score, or a policy change for the resource based at least on the generated DRI score is reported to an administrator.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of a method for generating a DRI score for a resource based at least on a weight, in accordance with an example embodiment.

FIG. 5 shows a flowchart of a method for generating an aggregated DRI score, in accordance with an example embodiment.

Figure 1:
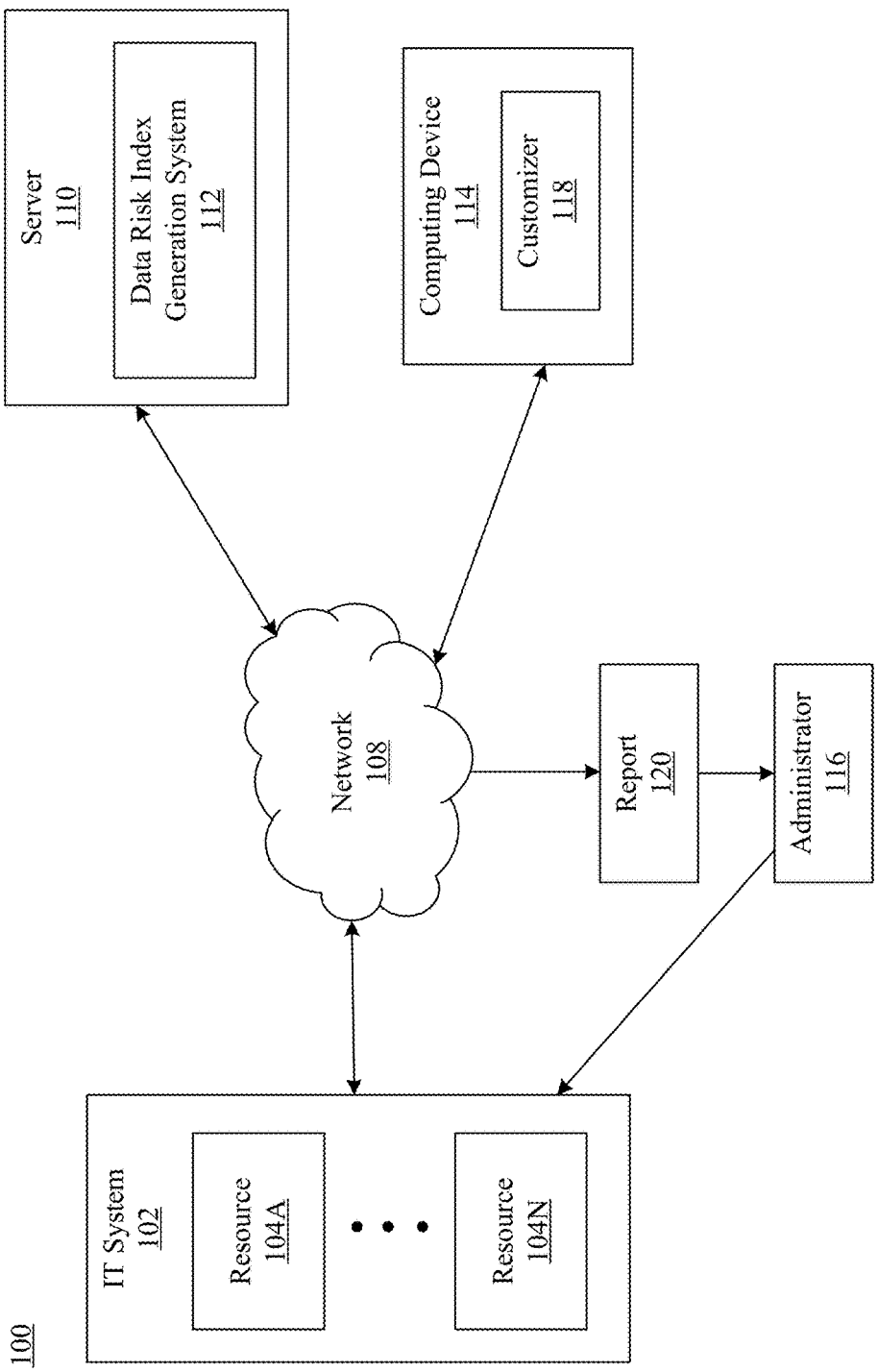
FIG. 1 shows a block diagram of a system for assigning a risk score to a resource, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

More and more, enterprises and other groups of users are turning to platforms such as Amazon Web Service® (AWS), Microsoft Azure™, and Google Cloud Platform™ (GCP) not only for storage, but also for other services such as hosting, building, testing, deploying and running applications. At the same time, even the types and complexity of accessible resources are increasing and include, for example, the Relational Database Server (RDS) and the file storage service Glacier® provided by Amazon, the SQL Server® provided by Microsoft, and many other resources used for the storage, transmission, and/or processing of information as described herein.

Each identity that is granted permissions to perform actions on a shared resource adds some incremental risk for the occurrence of security incidents such as unauthorized data access, data corruption due to improper behavior or compromise, data accessibility issues at inopportune times or even permanent data loss, etc. What is needed is some mechanism to quantify such risk and thereby make it possible to take action when the risk is too great. This need is not limited to remote computing environments; such a mechanism would also be advantageous in situations where data risk affects even non-remote computing environments, such as in many large enterprises with their own often extensive server and computing infrastructures, as well as other types of local networks of users.

Embodiments described herein are directed to assigning a security risk score to a resource. In an example system, a data risk index (DRI) score generator collects resource access data for a resource. Based at least on the resource access data, the DRI score generator generates a DRI score for the resource. The DRI score comprises a value that is indicative of a level of risk that the resource will be compromised. A DRI reporter is configured to report, to an administrator, at least one of the DRI score, an alert based at least on the DRI score, or a policy change for the resource based at least on the generated DRI score.

Generating a DRI score for a resource as described herein has numerous advantages, including improving the security of resources stored on and/or accessible via computing devices, improving the security of the computing devices generally, improving the security of a network coupled thereto. For example, by generating a DRI score for a resource that is indicative of a level of risk that the resource will be compromised, resources that are at a higher risk of being compromised can be readily identified. For instance, the DRI score for a resource and/or a security alert based thereon may be provided to an administrator, enabling the administrator to determine which resources across an organization are at risk of resulting in a security incident, such as by a data breach or other loss of confidentiality, corruption of data or other loss of integrity, removal of data or other loss of availability, etc. Based on such information, appropriate preventative measures or policy changes may be recommended and/or implemented to improve the DRI score, such as removing granted but unused permissions or modifying other permissioning policies, changing a security policy, changing an action that may be performed on the resource (e.g., limiting the ability to perform certain types of actions), changing a set of identities that have permission to access the resource, or other suitable measures to reduce the probability of a security incident being generated for the resource. In some scenarios, such policy changes may be automatically implemented to improve the security of the resources.

In addition to advantageously enabling improvements to the security of resources, the described techniques also enable improvements in the computing devices and/or network that include or provide access to such resources. For instance, because the DRI scores may identify high-risk resources in an environment, knowledge regarding other high-risk areas may also be identified. For instance, if a DRI indicates that a particular sensitive resource is at a very high risk of being compromised, it may also be determined that another resource (e.g., the computing device that includes the sensitive resource or makes such a resource accessible) does not have adequate security policies in place generally (e.g., a lack of encryption for resources stored thereon). As a result, security of other resources (e.g., the computing devices themselves) may also be improved by identifying high-risk resources for which remediation actions may be implemented to reduce the risk level. Further, by mitigating the possibility of a compromise of a resource, sensitive information (e.g., user login credentials, personal information, organizational information, etc.) that may be used to exploit vulnerabilities within an organization may be better protected, further reducing the likelihood that an organization will suffer a larger compromise of its resources (e.g., authorization systems). Thus, techniques described herein may overall reduce the effect of attempted malicious activity occurring with respect to resources generally (which include but are not limited to storage devices, computing devices, and networking devices coupled thereto).

As such, example embodiments are described herein directed to techniques for scoring a resource to determine a risk level. For instance, FIG. 1 shows a block diagram of a system 100 for assigning a risk score to a resource, in accordance with an example embodiment. As shown in FIG. 1, system 100 includes an Information Technology (IT) system 102, a server 110, a computing device 114, an administrator 116, and a report 120. IT system 102, server 110, computing device 114, and/or administrator may be communicatively coupled by a network 108. IT system 102 includes resources 104A-104N. Server 110 includes a data risk index (DRI) generation system 112. Computing device 114 includes a customizer 118. As shown in FIG. 1, report 120 may be provided to administrator 116. An example computing device that may incorporate the functionality of IT system 102, server 110, computing device 114, and/or administrator 116 (or any subcomponents therein, whether or not illustrated in FIG. 1) is described below in reference to FIG. 8. It is noted that system 100 may comprise any number of devices, including those illustrated in FIG. 1 and optionally one or more further devices or components not expressly illustrated. System 100 is further described as follows.

Network 108 may include one or more of any of a local area network (LAN), a wide area network (WAN), a personal area network (PAN), a combination of communication networks, such as the Internet, and/or a virtual network. In example implementations, IT system 102, server 110, computing device 114, and/or administrator 116 communicate via network 108. In an implementation, any one or more of IT system 102, server 110, computing device 114, and/or administrator 116 may communicate over network 108 via one or more application programming interfaces (API) and/or according to other interfaces and/or techniques. IT system 102, server 110, computing device 114, and/or administrator 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

IT system 102 may comprise any one or more computing devices, servers, services, local processes, remote machines, web services, etc. for hosting, managing, and/or providing access to any one or more of resources 104A-104N. For instance, IT system 102 may comprise a server coupled to an organization's network, a remotely located server, a cloud-based server (e.g., one or more servers in a distributed manner), or any other device or service that may host, manage, and/or provide access to one or more of resources 104A-104N. Resources 104A-104N comprise any type of software or hardware component of a computer (or a combination thereof) that is accessed or utilized by one or more entities in a computing environment. In some examples, a resource is defined by a collection of information or data that is stored in a storage device. In other examples, a resource includes one or more physical or virtual components of a computing device for processing information (e.g., a processor). In examples therefore, resources 104A-104N include, but are not limited to, a computer or processor, a physical host, a virtual machine, software (e.g., software as a service (SaaS), a platform as a service (PaaS), etc.), licenses, devices (including network devices), a memory or storage (e.g., physical storage devices, local storage devices, cloud-based storages, disks, hard disk drives, solid state devices (SSDs), random access memory (RAM) devices, etc.), data stored within a storage (e.g., files, databases, etc.) or any other component or data of a computing environment that may be accessed or utilized by one or more entities.

For instance, resources 104A-104N may include data that is sensitive (e.g., confidential, critical, private, secure, and/or not otherwise intended for public dissemination), such as company records, personal information, educational information, health information, professional information, organizational or company information, banking or other financial records, legal documents, biographic information such as birth certificates, driver's licenses, passports, etc. These examples are illustratively only, and resources 104A-104N may include any other type of data (including both confidential and non-confidential information) that may be stored in any device whether locally and/or on a cloud-based storage. In some examples, resources 104A-104N may be stored in a secure manner, such as via password protection, encryption (e.g., public and private key encryption, symmetric keys, etc.), or any other secure manner as appreciated by those skilled in the relevant arts.

In implementations, resources 104A-104N may include the resources for a particular organization (e.g., a company), a group or division (e.g., based on geography) of an organization, an individual, or any combination thereof. Further, in some implementations, resources 104A-104N may comprise resources belonging to a plurality of tenants (e.g., different clients or customers, such as different organizations) of a cloud services provider (or other storage provider) that provides storage resources for resources 104A-104N and/or manages the security thereof. In one example, resources 104A-104N may comprise resources associated with (e.g., owned by) a plurality of unrelated or independent tenants, such as resources of companies lacking any meaningful business relationship with each other.

Note that the variable "N" is appended to various reference numerals for illustrated components to indicate that the number of such components is variable, with any value of 1 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Server 110 comprises any number of devices, such as a network-accessible server (e.g., a cloud computing server network) that may comprise software or a service for managing any of resources 104A-104N. As described in greater detail below, such as management of any of resources 104A-104N may include, but are not limited to, managing a security of any of resources 104A-104N. For instance, server 110 may be configured to determine a risk level for one or more of resources 104A-104N, and provide information associated with the determined risk to administrator 116. In some examples, such a software or service may be provided as a cloud service that administrator 116 may access (e.g., via a web browser or other software) for viewing, accessing, and/or managing any of resources 104A-104N. Server 110 may comprise a group or collection of servers (e.g., computing devices) that are each accessible by a network such as the Internet (e.g., in a "cloud-based" embodiment). In example embodiments, server 110 is a computing device that is located remotely (e.g., in a different facility) from administrator 116, computing device 114, and/or IT system 102, and communicatively coupled thereto via network 108. Server 110 may comprise any number of computing devices, and may include any type and number of other resources, including resources that facilitate communications with and between servers, storage by the servers, etc. (e.g., network switches, storage devices, networks, etc.). In an embodiment, devices of server 110 may be co-located (e.g., housed in one or more nearby buildings with associated components such as backup power supplies, redundant data communications, environmental controls, etc.) to form a datacenter, or may be arranged in other manners. Accordingly, in an embodiment, server 110 may be a datacenter in a distributed collection of datacenters.

DRI generation system 112 is configured to generate a DRI score for one or more of resources 104A-104N. In examples, DRI generation system 112 may analyze resource access data associated with a resource of resources 104A-104N. As described in greater detail below, the resource access data includes any information associated with how a resource has been or can be accessed, including but not limited to prior usage data, permissions, privileges, or access-control settings for the resource. For instance, resource access data as described herein can include an identification of identities that have any type of access (e.g., read, write, delete, etc.) to the resource, actions that have been, or can be, performed on the resource, and/or other information associated with a prior usage of or permission to access the resource and generate a DRI score based thereon. In some implementations, the DRI score may take into account other factors associated with the resource in generating the DRI score, such as one or more weights, a sensitivity level of the resource, or any other factor. Further details of the generation of the DRI score by DRI generation system 112 will be described in greater detail below.

Administrator 116 may be any entity, human or otherwise (such as a bot), that may monitor, manage, or administer an authorization system for resources 104A-104N via management software or any other user interface. Administrator 116 may also be, or communicate with, the entity that computes the DRI score (e.g., DRI generation system 112). In examples, administrator 116 may be a software module within a single computer, or it may be a group of cooperative software modules running on different hosts that collect resource access data of respective identities and compute respective metrics, or communicate this data to a higher-level administrator that computes metric(s) more centrally, or a combination of these options. Administrator 116 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Administrator 116 is not limited to a physical machine, but may include other types of machines or nodes, such as a virtual machine. Administrator 116 may interface with other components illustrated in FIG. 1 through APIs and/or by other mechanisms. Depending on the implementation, administrator 116 may also be a human, and in some cases different administrator functions may be performed automatically and by a human operator in the same implementation.

In implementations, administrator 116 comprises an entity that consumes report 120 and/or any other information generated by DRI generation system 112. In some examples, administrator 116 may perform any changes (e.g., policy changes or other remediation actions) with respect to resources 104A-104N based at least on report 120. Report 120 comprises any information generated by DRI generation system 112. For instance, report 120 may comprise a DRI score (e.g., a current or potential DRI score) generated for any of resources 104A-104N, an alert based at least upon a generated DRI score (e.g., a notification that a particular resource or set of resources is at a heightened risk of being compromised), a policy change, or any other information associated with a risk level of a resource. A policy, as used herein, includes any set of rules and conditions that define how components of a computing environment are accessed. For instance, a policy can define the set of entities that are permitted to utilize a resource and/or conditions that are to be met by the entities in permitting access. Examples of policies as described herein include, but are not limited to, an access policy that defines a set of entities that are permitted to access a resource or a security policy that comprises rules that govern the activities of an organization and/or associated resources. These examples are not intended to be limiting, and it is understood that report 120 may include any information generated by DRI generation system 112 and/or any information associated with a risk level of any of resources 104A-104N.

In some implementations, administrator 116 may comprise automated software that consumes information generated by DRI generation system 112 (e.g., without a user interface or human interaction). In some other implementations, administrator 116 may comprise a user interface (UI) for interaction with DRI generation system 112 and/or any of resources 104A-104N (e.g., via a web browser by navigation to a web page, via an application stored thereon, etc.) including a graphical user interface (GUI), examples of which are described below with respect to FIG. 8. In some examples, the UI may comprise a web-based tool that includes an interface via which any of resources 104A-104N may be accessed (e.g., created, modified, viewed, deleted, etc.). In example embodiments, the UI may interact with DRI generation system 112 to present risk information associated with one or more resources, as will be described in greater detail below. The UI may comprise one or more UI elements (e.g., controls, display windows, interactive elements, menus, text-input fields, etc.) via which any of resources 104A-104N (and/or security associated therewith) may be accessed and/or managed.

Computing device 114 includes any number of one or more computing devices of one or more users (e.g., individual users, family users, enterprise users, governmental users, etc.) that each comprise one or more applications, operating systems, virtual machines, storage devices, etc. that may be used to access and/or manage any of resources 104A-104N. Computing device 114 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 114 is not limited to a physical machine, but may include other types of machines or nodes, such as a virtual machine. Computing device 114 may interface with other components illustrated in FIG. 1 through APIs and/or by other mechanisms. While computing device 114 and administrator 116 are illustrated as being separate, it is noted and understood that computing device 114 and administrator 116 (or any of the features described with respect to each of these components) may be combined together.

In examples, customizer 118 enables the configuration and/or management of various features of DRI generation system 112, as described herein. For instance, customizer 118 may comprise an interface that includes one or more interactive UI elements that enable the configuration (e.g., by a user and/or programmatically) of one or more weights that are used by DRI generation system 112 to generate a DRI score for any of resources 104A-104N. In other examples, customizer 118 may comprise one or more UI elements that enable the configuration of a sensitivity associated with any of resources 104A-104N. In yet other examples, customizer 118 may comprise one or more UI elements that enable customization and/or management of one or more policies (e.g., access policies, security policies, etc.) associated with any of resources 104A-104N. In some other examples, customizer 118 may be configured to implement any of the configurations described herein based on a set of generated configuration information (e.g., a configuration file), where such configuration information is generated by a user, by a software, or any combination thereof. These examples are only illustrative, and it is understood that customizer 118 may provide any type, number, and/or arrangement of elements to manage and/or customize the manner in which DRI generation system 112 operates and/or the manner in which any of resources 104A-104N are accessed.

It is noted and understood that implementations are not limited to the illustrative arrangement shown in FIG. 1. For instance, IT system 102, server 110, computing device 114, and/or administrator 116 need not be separate or located remote from each other. In some examples, any one or more of IT system 102, server 110, computing device 114, administrator 116 (or any subcomponents therein) may be located in or accessible via the same computing device or distributed across a plurality of devices. For instance, techniques described herein may be implemented in a single computing device. Furthermore, system 100 may comprise any number of storage devices, resources, networks, servers, and/or computing devices coupled in any manner.

Figure 2:
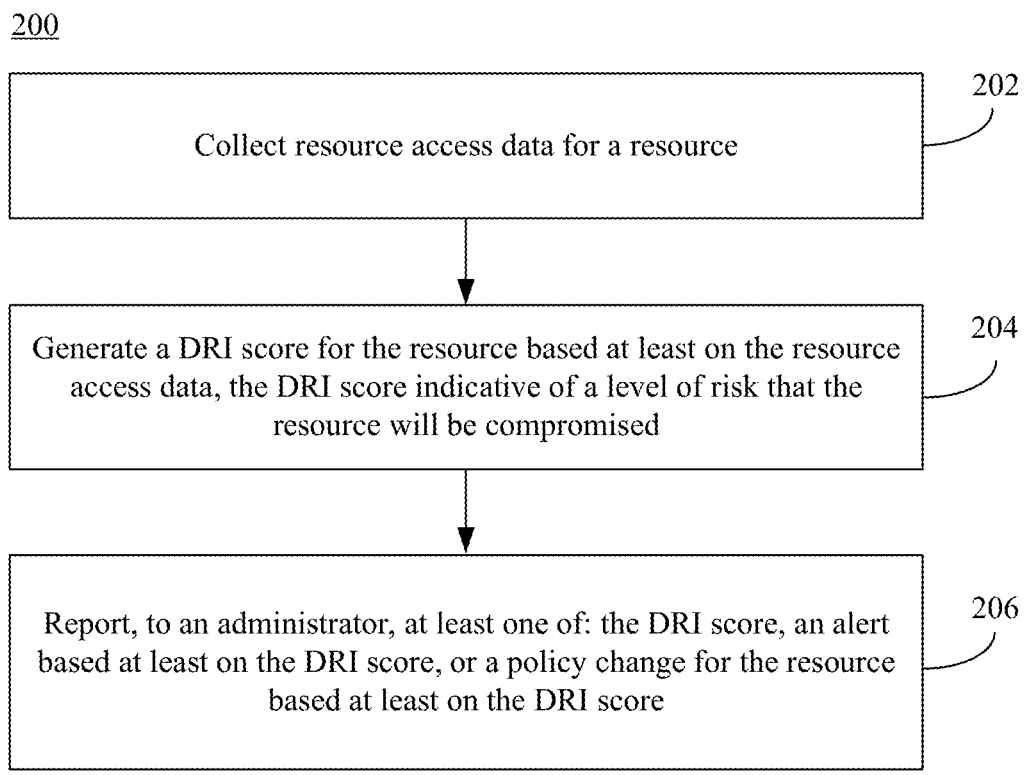
FIG. 2 shows a flowchart of a method for assigning a risk score to a resource, in accordance with an example embodiment.

DRI generation system 112 may operate in various ways to assign a risk level to a resource. For instance, DRI generation system 112 may operate according to FIG. 2. FIG. 2 shows a flowchart 200 of a method for assigning a risk level to a resource, in accordance with an example embodiment. For illustrative purposes, flowchart 200 and DRI generation system 112 are described as follows with respect to FIG. 3. While example embodiments are described with respect to flowchart 200 and components of system 300, these examples are illustrative. Additional details regarding the operation of the various features described herein are provided below in Section III.

Figure 3:
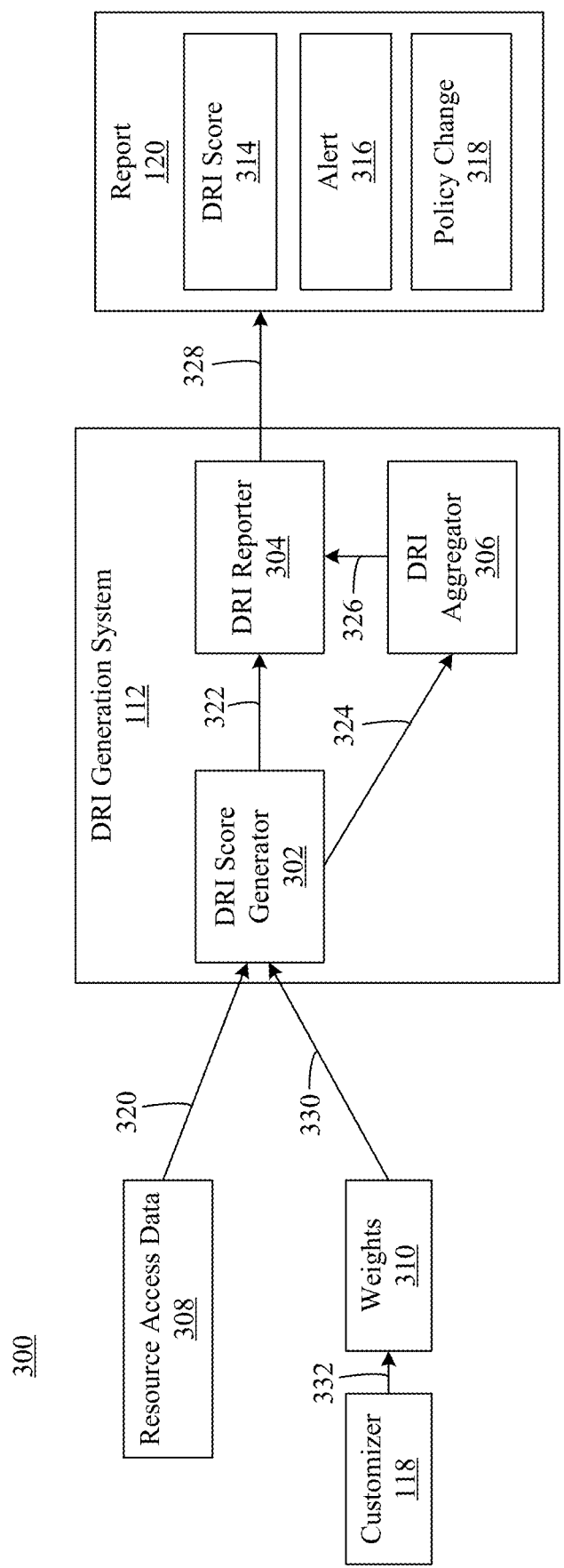
FIG. 3 shows a block diagram of a data risk index (DRI) score generation system, in accordance with an example embodiment.

FIG. 3 shows a block diagram of a DRI score generation system 300, in accordance with an example embodiment. As shown in FIG. 3, system 300 an example implementation of DRI generation system 112, customizer 118, and report 120. System 300 also includes resource access data 308 that is provided to DRI generation system 112 in examples. DRI generation system 112 includes a DRI score generator 302, a DRI reporter 304, and a DRI aggregator 306. Customizer 118 may provide one or more weights 310 to DRI generation system 112. Report 120 includes a DRI score 314, an alert 316, and a policy change 318. Flowchart 200 and system 300 are described in further detail as follows.

Flowchart 200 begins with step 202. In step 202, resource access data is collected for a resource. For instance, with reference to FIG. 3, DRI score generator 302 collects 320 resource access data 308 for one of resources 104A-104N. Resource access data 308 may include any information associated with the access of any of resources 104A-104N, including but not limited to past usage information, permissions, privileges, and access-control settings for a resource or set of resources. In some examples, resource access data 308 includes a history of actions performed by an identity on a resource of resources 104A-104N. An identity, as used herein, identifies an entity or agent that is in control of a computer or computer function and has the ability to cause operations to be performed in the computing environment. The identity can comprise a unique string (such as name, username or alias, device identifier, etc.) of alphanumeric symbols that identifies the entity or agent. In examples, an identity can refer to an entity or agent that can access a resource in the computing environment and/or perform one or more actions with respect to the resource. Examples of an identity include an identifier of an entity that is in control of a computer (e.g., an account associated with a particular user, as indicated by a respective user identifier), a process in a computing environment, and an automated service (e.g., a "bot"). In examples, resource access data 308 may include a set of identities in a particular environment (such as identities belonging to a particular customer or organization), and for each identity, which actions are performed on each resource.

In some implementations, resource access data 308 includes access permission information for any identity or resource in an environment. Permissions, also referred to herein as privileges, are rules that define types of permitted and unpermitted accesses. Permissions are granted to entities that are allowed to perform one or more tasks on a resource. Tasks include operations that are performed with respect to a resource, such as reading, writing, creating, deleting, inserting, updating, moving data, running code, etc., all of which have some effect on or involve at least one resource. As used here, an "action" is an instruction that carries out a given task to or on a resource. Collectively, information associated with an identity, action, and resource as those terms are used herein may be referred to as an "identity-action-resource triplet." Accordingly, in some implementations, resource access data 308 may include information that comprises identity-action-resource triplets that indicate, for instance, permissions of one or more identities, actions performable or performed by one or more identities, and/or associated resources.

In examples, access permission information may identify which identities (e.g., by individuals, groups, team, etc.) have permission to access each resource of resources 104A-104N and/or the type(s) of permission (e.g., read only, write only, read-write, delete, etc.) each identity possesses to access each resource. In other words, resource access data 308 may indicate which permissions each identity of a plurality of identities possesses to perform one or more actions on each resource. In other implementations, access permission information may include an overall number of identities that have access to a resource and/or which type(s) of permissions are granted for any or all of the identities. These examples are only illustrative, and other information associated with a usage and/or access of any of resources 104A-104N is contemplated, including any of the combinations described herein. Further, in some implementations, DRI score generator 302 may also be configured to ingest one or more other metrics or indexes as an input, such as other scores that rate a riskiness level of a resource, identity, and/or action measured in other ways.

Collecting resource access data in this manner may enable analytics to be performed on how resources in a computing environment are accessed and/or can be accessed, thereby allowing for determining which granted permissions in the computing environment are unnecessarily risky. Further, by collecting a set of data that is indicative of real-world behaviors and/or permissions in the computing environment, an accurate assessment may be made in determining which behaviors and/or permissions have a higher risk of resulting in a compromise or other breach of data.

In step 204, a DRI score is generated for the resource based at least on the resource access data. For instance, with reference to FIG. 3, DRI score generator 302 is configured to generate a DRI score for any of resources 104A-104N based at least on resource access data 308. In examples, the DRI score generated by DRI score generator 302 is indicative of a level of risk that a resource of resources 104A-104N will be compromised (e.g., due to a data breach or leak, data corruption, or data inaccessibility or loss, etc.). For instance, the DRI score may comprise a measure, value, grading, etc. that measures a security risk associated with each resource. The DRI score may be generated in various ways, as will be described in greater detail below. In some implementations, the DRI score is generated as a function of a probability or a likelihood that a resource will be compromised. In some further implementations, the DRI score may be generated as a function of a probability that a resource will be compromised and an impact level of a security incident associated with the resource (e.g., an impact level in the event a compromise occurs). A probability that a security incident or event occurring can be determined in various ways, such as through empirical data and label generation for supervised learning, through suggestion(s) by one or more users (e.g., security analysts, administrators, experts, etc.), through simulation, or in any other suitable manner. In example embodiments, a risk that a resource will be compromised may also refer to a probability that a security incident will be generated for the resource. These examples are illustrative only, and additional examples of the generation of the DRI score are discussed herein.

In some examples, the DRI score may analyze resource access data 308 to determine a level of risk for a resource. For instance, DRI score generator 302 may determine, based on an analysis of resource access data 308, that a particular resource is over-permissioned (e.g., the resource has granted, but unused permissions), and generate a heightened DRI score as a result. In other examples, DRI score generator 302 may determine, based on an analysis of resource access data 308, that a high number of identities have access to a particular resource, and generate a heightened DRI score as a result.

In examples, DRI score generator 302 may generate a DRI score for each resource. It is understood that a resource is not limited to a single resource (e.g., a single file, service, component of a computing system, etc.), but may include a set of resources (e.g., a grouping of files, a folder, a bucket, a blob, a type of file, a collection of services, a collection of components of a computing system, etc.). In some implementations, DRI score generator 302 may generate a DRI score for each resource across an organization and/or rank the generated DRI scores (e.g., most risky to least risky). In one example, DRI score generator 302 may generate a DRI score periodically (e.g., monthly, weekly, daily, hourly, nightly, etc.), each time resource access data 308 is obtained, or based on any other timing. In another example, DRI score generator 302 may be triggered to generate the DRI score based on a user input. In another example, DRI score generator 302 may be triggered to generate the DRI score based on an event. Such an event can include any automated or semi-automated program, instructions, rules, etc. that detect an occurrence of a condition in an environment such as an action (e.g., an addition, modification, deletion, etc.) or threshold number of actions processed with respect to a resource (or threshold number of resources), a change of a permission or access-control setting, a change to a policy of an authorization system associated with the resource, detection of an anomaly in the environment (e.g., by a security software and/or an individual), or other types of events that may have an impact on the security of resources in the computing environment. In another example, DRI score generator 302 may be triggered by a simulation engine configured to execute different scenarios and determine and/or assess hypothetical (e.g., predicted) probabilities of security incidence under one or more of such scenarios.

Such a DRI score may therefore serve to indicate which resources have a higher risk of being compromised. By identifying the resources that are more likely to result in a compromise of data and creating a DRI score representative of the risk level, preventative measures may be taken and/or prioritized (e.g., by addressing the highest-risk resources first) to improve the security of the computing environment. In implementations, prioritization of DRI scores may be performed within a single authorization system or across multiple authorization systems (e.g., systems for which ratios or DRI score comparisons are provided).

In step 206, at least one of the DRI score, an alert based at least on the DRI score, or a policy change for the source based at least on the DRI score is reported to an administrator. For instance, with reference to FIG. 3, DRI reporter 304 is configured to obtain 322 the DRI score generated by DRI score generator 302 and report 328, to an administrator, a report 120 that includes at least one of DRI score 314, alert 316, or policy change 318 (or any combination thereof). DRI score 314 may comprise the DRI score generated by DRI score generator 302 and/or any other scores as described herein, including but not limited to component scores, aggregated (e.g., organization) DRI scores, or a plurality of scores generated for each of a plurality of resources. Alert 316 may include any type of information presented to a user based at least on the generated DRI score, such as an alert that a resource (or resources) has a DRI score above a threshold value, a prioritization or ranking of DRI scores generated by DRI score generator 302 for a plurality of resources (e.g., highest to lowest risk scores), a risk category associated with each reported DRI score (e.g., low, medium, high, very high, etc.).

As described in greater detail below, the generated DRI score may comprise a combination of various component scores, such as a confidentiality score, a data integrity score, an availability score, or any other component score for the resource. In some implementations, the combination (e.g., summation) of the component scores may make up the generated DRI score. In implementations, the component scores may be generated so as to provide a desired granularity for how the overall DRI score is generated. In examples, each component score may be generated based on certain types of actions. For instance, actions performable on a resource that affect confidentiality may be assigned to the confidentiality component score, actions performable on a resource that affect data integrity may be assigned to the data integrity component score, and actions performable on a resource that affect availability of a resource may be assigned to the availability component score. It is noted and understood that a given action may affect multiple components, and therefore may be assigned to a plurality of component scores. Additional details regarding confidentiality, integrity, and availability (CIA) scores are described below.

These examples are not intended to be limiting, as it will be appreciated that other types of information may also be reported. For instance, report 120 may identify the resource for which the DRI score was generated, one or more identities associated with the resource, actions taken on the resource, resource access data associated with the resource (including but not limited to past usage information and/or permission information), a weight or weights that factored into the generation of the DRI score for the resource, a subset of DRI scores that resulted in a computation of an aggregate DRI score, or any other information that factored into the generation of a DRI score for a resource. It is also understood that in some implementations where administrator 116 includes a UI, the UI may include one or more interface elements that improve the viewability of and/or interaction with report 120 (and information contained therein), such as charts, graphs, tables, analytics, insights, lists, filters, sorting options, etc. associated with a score or scores generated by DRI score generator 302. The examples are only illustrative, and it is understood that other UI elements or features may also be provided to enable dynamic interaction with the information provided therein. In some further implementations, report 120 may also include any information associated with one or more previously generated DRI scores for a resource, such as to enable a comparison between the previously generated DRI scores with an updated DRI score for a resource. In another implementation, report 120 may include information relating an updated DRI score for a resource (or set of resources) after one or policy changes were implemented (e.g., one or more recommended remediation actions), such as whether the DRI score for the resource (or set of resources) improved after implementation of the change(s).

Policy change 318 includes any type of modification to a set of policies associated with the resource for which the DRI score was generated, identities that have permissions for the resource, or actions that can be performed on the resource. In some examples, policy change 318 may comprise a new policy, a deletion of an existing policy, or an alteration to an existing policy for a customer or tenant that are expected to result in an improved DRI score for the resource or a set of resources. In implementations, policy change 318 may be reported as recommended policy change such that an administrator may view and/or edit prior to implementation. For instance, in implementations where administrator 116 includes a UI, the UI may provide one or more interface elements via which policy change 318 may be implemented (e.g., with a single click or a series of clicks). In other examples, policy change 318 may be reported as a set of steps or scripts that may be carried out or implemented in order to improve a DRI score for the resource. In other examples, implementation of policy change 318 may be automated (e.g., without user input), such as by automatically modifying privileges, permissions, or access-control settings for a resource.

Various types of policy changes are contemplated herein, including but not limited to a modification (e.g., addition, deletion, change, etc.) of a resource-centric policy, an identity-centric policy, or an action-centric policy, or any combination. For instance, policy changes can comprise any change to the manner in which a resource may be accessed, the identities that have access to the resource, actions performable on the resource, or any combination thereof. As one example, a policy change can include a removal of granted privileges where such privileges have been unused for a predetermined period of time (e.g., unused for 30 days). In another example, access to a resource (e.g., by a particular identity, a group of identities, or all identities) may be modified or removed altogether. In another example, a policy change can include changing permissions on identities that have access to a resource and/or contacting identities that have accessed the resource for any number of purposes. In another example, the policy change can include changing the set of actions that are performable on a resource. In another example, a policy change can comprise a change to an encryption type (e.g., encrypting a resource, utilizing a different type of encryption, utilizing a new or different private key, etc.). In other examples, any other type of setting associated with security of a resource may be implemented or changed. Thus, policy changes described herein can include, as non-limiting examples, a change to a security policy, a granted but unused permission an identity has for the resource, an action performable on the resource, a set of identities that have permission to access the resource, or any other change that affects the manner in which a resource may be accessed, actions performable on the resource, and/or identities that have access to the resource.

In this manner, DRI reporter 304 may enable improvements to the security of resources and an overall computing environment in which the resources are located by providing, to an administrator, scoring information that identifies resource risk levels and/or preventative measures that can be taken (or implemented automatically) with respect to the resources in the computing environment, such as by removing or limiting permissions that are identified as high-risk.

In some implementations, weights may be factored into the generation of a DRI score. For example, FIG. 4 shows a flowchart 400 of a method for generating a DRI score for a resource based at least on a weight, in accordance with an example embodiment. In an implementation, the method of flowchart 400 may be implemented by DRI score generator 302. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a weight associated with at least one of the resource, an identity permitted to access the resource, or an action that can be performed on the resource is received. For instance, with reference to FIG. 3, DRI score generator 302 is configured to receive 330 weights 310. In some implementations, customizer 118 may provide 332 weights 310 for receipt by DRI score generator 302. In other implementations, weights 310 may be computed and/or updated through other techniques, as described below. Weights 310 may include one or more weights associated with any of the factors described herein with respect to generation of a DRI score. In examples, weights 310 can comprise a scaling factor associated with any of resources 104A-104N, an identity permitted to access the resource, and/or an action that can be performed on the resource. In other words, weights may include a scaling factor associated with any aspect of an identity-action-resource triplet.

For instance, a weight may be assigned to a particular resource based on an importance of the resource itself. For instance, a resource that is deemed to be important to a customer (e.g., financial information, trade secrets, etc.) may be assigned a higher weight, such that a DRI score generated for the resource will be heightened. In other examples, a weight may be received for a particular identity that has access to any of resources 104A-104N. For instance, if a particular identity (or group of identities) is expected to be a higher-risk (or lower-risk) identity, a corresponding weight may be provided to reflect the level of risk associated with the particular identity. In other examples, a weight may be received for each type of action that may be performed on a resource, such as a first weight for a first type of action (e.g., modifying a resource by any identity), a second weight to a second type of action (e.g., deleting a resource by any identity), etc.

In yet other examples, a weight may be received for a pair of factors (e.g., an identity-action pair), such as by assigning a weight for one or more types of actions performed by an identity. An example of such weights may include assigning, for a given identity, a first weight for an action relating to viewing a resource, a second weight for an action relating to copying a resource, a third weight for an action relating to deleting a resource, etc. Other weights are also contemplated herein, such as a weight for identity-resource pair, a weight for an action-resource pair, or a weight for an identity-action-resource triplet. In this manner, weights 310 (e.g., provided via customizer 118 or computed and/or updated via other techniques) may enable customization of the manner in which DRI score generator 302 generates DRI scores for resources 104A-104N, thereby enabling customers to receive DRI scores tailored to their own environments.

In some implementations, a weight may be received that indicates a level of sensitivity of a resource (e.g., from 0 to 100). For instance, if a resource is identified as containing highly sensitive information, a high sensitivity value may be assigned for the resource. Additional details regarding a sensitivity of a resource and its effect on generation of a DRI score are provided below.

It is also noted that weights 310 need not be initially inputted via customizer 118. In some other implementations, weights 310 described herein may be provided as an initial set of predetermined weights (e.g., pre-assigned and/or inferred from a customer environment), such that any of the weights may be selectively modified via customizer 118 based on a customer's environment. In some other implementations, weights 310 may be computed and/or updated in accordance with other techniques, such as without customizer 118 and/or one or more predetermined weights. For instance, any of the values of weights 310 may be computed and/or updated automatically and/or dynamically via a program or any other set of instructions. In another implementation, a customer may access a suitable UI that is in communication with customer 118 to provide, modify, and/or view any of the weights described herein.

In step 404, the DRI score for the resource is generated based at least on the resource access data and the weight. For instance, with reference to FIG. 3, DRI score generator 302 is configured to generate the DRI score for any of resources 104A-104N based at least on resource access data 308 and weights 310. DRI score generator 302 may utilize one or more weights in generating the DRI score in various ways, as described in greater detail below. For example, DRI score generator 302 may generate a heightened DRI score where a heightened weight is provided for one or more aspects of the identity-action-resource triplet.

In this manner, DRI scores that are generated for resources of an organization may be tailored to the particular circumstances of that organization, thereby resulting in the generation of risk level data that has an increased usability for administrators of the organization. Since the DRI score may be accurately tailored in this manner, administrators of the organization may be able to readily identify, using the customized DRI scores, which resources are higher-risk based on the organization's circumstances, and therefore address risky permissioning in a more accurate manner. Furthermore, not only will addressing risky permissions occur in a more accurate manner, but also in a more timely manner as DRI scores may be regenerated or recomputed (e.g., periodically and/or based on a trigger as described herein, such as each time a policy of an authorization system is changed). As a result, further enhancement of the security of an organization's resources is contemplated.

In some implementations, a set of scores may be combined to generate an organization score. For example, FIG. 5 shows a flowchart 500 of a method for generating an aggregated DRI score, in accordance with an example embodiment. In an implementation, the method of flowchart 500 may be implemented by DRI score generator 302, DRI reporter 304, and/or DRI aggregator 306. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a plurality of DRI scores is generated, each DRI score corresponding to a different resource of an organization or perspective on risk. For instance, with reference to FIG. 3, DRI score generator 302 is configured to generate, for each of a plurality of resources 104A-104N, a corresponding DRI score. In examples, DRI score generator 302 may generate a DRI score for each of a plurality of different resources of an organization or any other grouping. The organization is not limited to a company's entire set of resources, but may include a subset of the organization's resources, such a subset based at least on a division, team, geographic location, subject matter, resource type, or any other grouping. In implementations, DRI score generator 302 may generate a DRI score for each such resource in a similar manner as described herein with respect to generating a DRI score for a single resource. In another example, the plurality of DRI scores may be generated based on perspectives on risk, such as by generating component scores described herein that relate to different risk perspectives (e.g., a confidentiality score, a data integrity score, an availability score, or any other component score for the resource), where such scores may be defined by specific weights between identities accessing a given resource and the actions performed by the identities.

In step 504, the plurality of DRI scores is aggregated to generate an aggregated DRI score. For instance, with reference to FIG. 3, DRI aggregator 306 is configured to receive 324 the plurality of DRI scores generated by DRI score generator 302 and aggregate received scores to generate an aggregated DRI score. DRI aggregator 306 may aggregate the plurality of DRI scores in a variety of ways, as described herein. In some examples, DRI aggregator 306 may generate the aggregated DRI score based on averaging the DRI scores. In some other examples, DRI aggregator 306 may generate the aggregated DRI score based on weighting certain scores more than other scores and combining (e.g., averaging) the weighted scores. In other examples, high-risk DRI scores may be more heavily weighted than low-risk scores. In one example, each DRI score may be weighted by itself in generating the aggregated DRI score to emphasize high scores and prioritize de-risking the riskiest resources. In some other examples, only a subset of the individual DRI scores is used in generating the aggregated DRI score (e.g., DRI scores associated with a selected set of resources such as resources that are identified as being more sensitive to an organization, the highest n number of DRI scores, where n is any integer, or any other subset). These examples are not limiting, and it is understood that other suitable approaches may be taken to aggregate the plurality of DRI scores generated for the resources of an organization.

In step 506, the aggregated DRI score is provided to the administrator. For instance, with continued reference to FIG. 3, DRI reporter 304 is configured to obtain 326 the aggregated DRI score from DRI aggregator 306 and provide the aggregated DRI score to administrator 116. In some example implementations, DRI score 314 may comprise the aggregated DRI score (e.g., as an org-level score). In some implementations, DRI reporter 304 may be configured to, as an alternative to or in addition to providing the aggregated DRI score to administrator 116, provide alert 316 and/or policy change 318 based at least an aggregated DRI score, in a similar manner as described herein.

Such a metric may enable an administrator or manager of an organization to assess their organization's overall data risk at a higher-level, thereby allowing for both higher-level security changes and/or more granular changes to reduce the risk level that a resource will be compromised. For instance, by providing an aggregated DRI score, risk levels associated with different authorization systems of an organization may compared to each other (e.g., depending on the manner in which the DRI scores for each authorization system are computed), allowing organizations to focus on the riskiest authorization systems and/or the riskiest resources within each authorization system. Further, providing an aggregated DRI score as descried herein may enable an administrator to readily determine how secure their resources are compared to other groups that may be similarly situated (e.g., other teams, organizations, industries, etc.). In some implementations, a comparison metric may also be provided, such as a percentile or grading indicating a particular organization's ranking among other groups (e.g., by indicating that an organization's DRI score is in the 70th percentile among companies of similar sizes, locations, industries, etc.). Based on such information, even further improvements to the security of an organization's resources may be provided using the comparative risk level information.

III. Further Description of and Additional Risk Score Generation Embodiments The following sections are intended to further describe the above example embodiments and describe additional example embodiments in which implementations may be provided. Furthermore, the sections that follow explain additional context for such example embodiments and details relating to the implementations. The sections that follow are intended to illustrate various aspects and/or benefits that may be achieved based on techniques described herein, and are not intended to be limiting. Accordingly, while additional example embodiments are described, it is understood that the features described below are not required in all implementations.

In example risk score generation embodiments, techniques may be implemented by or in one or more of IT system 102, resources 104A-104N, network 108, server 110, DRI generation system 112, computing device 114, administrator 116, customizer 118, report 120, DRI score generator 302, DRI reporter 304, DRI aggregator 306, resource access data 308, weights 310, DRI score 314, alert 316, and/or policy change 318. Other structural and operational implementations will be apparent to persons skilled in the relevant art(s) based on the following discussion.

Embodiments disclosed here determine and then use variations of a metric referred to as a DRI (e.g., DRI score 314), which may be per-resource for customer resources and/or aggregate, at an organization level, for individual customer authorization systems containing any number of individual resources. Resources (e.g., resources 104A-104N) may be of any type, both software and hardware or a combination. Physical hosts, memory and storage, virtual machines (VMs), devices, databases, network devices, services, software licenses, etc., are but a few of the many resources found in a typical computer environment.

These embodiments may find particular use in, among other environments, data centers, in devices for networking, storage, and firewalls, in SaaS ("Software as a Service") applications, both for remote, cloud-based infrastructures such as those mentioned above, and for on-premise enterprise computing environments. One use of this metric may be for reporting to administrators, who may use absolute or relative DRI values to make informed decisions about how to improve security, for example, by modifying existing permissioning policies; alternatively, or at the same time, the metrics may be applied to a routine that automatically adjusts permissions to meet some pre-set, availability-dependent, time-dependent, or other type of requirements, or other system changes such as an increase or decrease in availability of resources.

For convenience, the term "identity" refers here to any resource-accessing entity (or, in the plural, group of entities). Examples of identities include a human user in control of a computer, a process within a single computer system, or the computer system viewed as a whole, an automated service account (or "bot"), or any other human or automated entity that is able to issue a request to use a computer resource to which access may be limited to those with an associated permission. Resources may be within a single system, under the control of the same operating system and using the same hardware, or may be remote and distributed, such as in different servers in the "cloud", or any combination of these.

Similarly, the administrative entity ("administrator") (e.g., administrator 116) may be any entity, human or otherwise (such as a bot), that may monitor, manage, or administer an authorization system via management software or any other user interface. The administrator may also be, or communicate with, the entity that computes the metric(s) described below (e.g., DRI generation system 112). The administrator may be a software module within a single computer, or it may be a group of cooperative software modules running on different hosts that collect resource access data of respective identities and compute respective metrics, or communicate this data to a higher-level administrator that computes metric(s) more centrally, or a combination of these options. Depending on the implementation, the administrator may also be a human, and in some cases different administrator functions may be performed automatically and by a human operator in the same implementation.

Privileges (also known as "permissions") are granted to identities to perform tasks on resources. Tasks include such operations as reading, writing, creating, deleting, inserting, updating, moving data, running code, etc., all of which have some effect on or involve at least one resource. As used here, an "action" applies a task to a resource.

An authorization system typically provides granular policies for hundreds or thousands of different actions, although this scale is not required by embodiments of this invention. A single policy may also provide privileges to one or more entities, for one or more actions applying one or more tasks over a subset of one (or all) resources.

Desired Properties

A robust DRI metric should ideally have all or at least most of the following properties:

Bounded—The metric should preferably have a bounded range, such as [0,1], [0, 100], etc., so that consistent and comparable DRI scores can be reported to customers.

Increases with Number of Identities—Even if all permissions are exactly right-sized, so that there are no identities with unused granted permissions on a resource, risk should still increase with the number of identities that have access. For example, an AWS S3 ("Simple Storage Service") bucket for which 1000 identities have permission is inherently more prone to a data compromise than one for which only 10 identities have permission, even if all granted permissions are used by all identities with access.

Increases with Unused Permissions—An identity with unused granted permissions for a resource is riskier than an identity that uses all granted permissions.

Unaffected by Irrelevant Identities—The risk for a resource shouldn't be affected by adding or removing identities who don't have any permissions on that resource.

Avoid Normalization—Normalization will in many cases be incompatible with data-risk measures that satisfy the properties listed above, such as increased risk from more identities. Thus, absolute, that is, unnormalized, values are generally preferable to relative ratios, so that DRI scores remain comparable across environments. Nonetheless, if the system designer wishes to meet some other specifications or perform analyses that so require, it would also be possible to apply different types of known normalizations to DRI values.

Support Custom Weights—It is preferably possible to be able to specify weights for different identities and actions, or more generally, for sets of (identity, action) pairs.

Probability vs Likelihood

In some literature relating to probability theory and data security, the distinction between the concepts "probability" and "likelihood" is important. Broadly, "probability" is often stated as relating to possible results whereas "likelihood" relates to hypotheses. In such cases, when speaking of "probability", the value of a parameter may thus vary, but the characteristics (such as mean and standard deviation) of the underlying data distribution are known and fixed. "Likelihood", in contrast, involves varying the assumed characteristics of a data distribution to match observed results. For this reason, "likelihood" is sometimes viewed as "reverse probability". Consequently, some may view some of the routines described in this disclosure as relating to "likelihood" instead of "probability", even where the term "probability" is used, and vice versa. The invention is not limited to either choice of terminology but rather skilled programmers will understand how to implement the various routines given the disclosed equations and descriptions of those routines.

Security-Incident Probability

Each identity that is granted permissions to perform actions on a resource adds some incremental risk. Let $P_i$ represent the probability that identity i will result in a security incident, such as unauthorized data access or data corruption due to improper behavior or compromise. The total risk for the resource from all identities 1, . . . , n is then:

$$1 - \prod_{i=1}^{n}(1-P_i)$$

In the special case where all identities have the same constant risk, such that $P_i=p$ for all i, this expression reduces to:

$$1-(1-p)^n$$

Embodiments of the invention refine this general idea to yield concrete values for quantifying security-incident probability in DRI computations.

DRI Scoring Proposal

One wide-spread data security standard is the Payment Card Industry Data Security Standard (PCI DSS), which, as its name implies, relates to sensitive payment card information. Although one might assume that the formulas used in this standard could form the basis for computing a DRI value, most of them violate one or more of the desired properties listed above. This section discloses an embodiment based instead on the ideas of security-incident probability. Sections further below disclose other embodiments, including those that take into account different notions of "impact".

Note that these embodiments do not depend on an ability to determine the actual probability of a security incident, which would be extremely difficult. Attempting to define an actual probability would additionally require specifying an associated time period (e.g., probability of incident occurring during the next six months), or expressing the probability per unit time. Instead, embodiments use the general security-incident probability expression shown above to generate DRI scores that can be compared to each other in a meaningful way, and which satisfy the desired properties discussed above. This also makes it possible to rank-order of resources by DRI score, which in turn can be used to prioritize remediation efforts.

Core DRI Metric

In a basic embodiment (alternatives are presented farther below), the DRI metric (e.g., generated by DRI score generator 302) is a function of a security-incident probability value $S_P$ and may in the simplest case be set equal to it. Thus, in the simplest embodiment:

$$DRI=DRI(S_P)=S_P, \text{ where } 0 \leq S_P \leq 1$$

Requiring $0 \leq S_P \leq 1$ ensures that the DRI metric is in the bounded range [0,1]. DRI scores reported to customers may be scaled by some other factor, however, if it is desired for them to fall within a different final range; for example, scaling by 100 would lead to a range of [0,100], which may be easier to present graphically to customers.

Quantifying Security-Incident Probability

One example of an incident-probability metric is:

$$S_P=1-(1-\beta)^k$$

where $\beta$=base probability of security incident due to a single threat and k=effective threat count.

Effective Threat Count (k)

The earlier discussion of security-incident probabilities used separate probabilities $P_i$ for each identity with access to a resource. However, instead of separate $P_i$ values, for convenience, embodiments may use a constant "base probability" $\beta$, and manipulate the exponent $k_i$ to reflect different levels of risk induced by various identities. This works because, for values of $\beta$ near zero, $(1-\beta)^k \approx (1-k \cdot \beta)$, which means that an incident probability $P_i$ can be expressed accurately by choosing an appropriate $k_i$ such that $P_i=k_i \cdot \beta$.

Consider an illustrative example, in which one wishes to specify, or has otherwise determined, that identity A should have a security-incident probability $P_A=0.002$, and identity B should have a higher $P_B=0.01$. Suppose that the fixed base probability is $\beta=0.001$. Using $k_A=2$ and $k_B=10$, one obtains:

$$P_A=k_A \cdot \beta=0.002 \approx 1-(1-\beta)^2=0.001999$$

$$P_B=k_B \cdot \beta=0.010 \approx 1-(1-\beta)^{10}=0.009955$$

In other words, one can effectively achieve the desired per-identity security-incident probabilities by specifying the exponent k instead of specifying a custom per-identity probability. Given this, one useable expression for k is:

$$k=\Sigma_{i=1}^{n} k_i$$

$$k_i=I_i+f(U_i)$$

where
- $I_i$=base per-identity threat value for identity i (default=1, for example)
- $U_i$=number of unused granted actions for identity i
- $f(U_i)$ is a chosen function of $U_i$ In other words, each identity i yields one threat (for having any permissions on the resource at all), plus an additional degree of threat based on its unused granted actions for the resource. Different functions $f$ may be chosen, depending on how one chooses to quantify the risk of an increase in an identity's failure to use granted actions. One choice used in a prototype of an embodiment of the invention is:

$$f(U_i) = \sqrt{U_i}$$

This choice for $f(U_i)$ has two effects. First, it reflects a decreasing marginal incident probability for each additional unused granted action; this, in turn, reflects the intuitive assumption that the risk from the first few unused permissions is larger than the incremental risk from the last few. Second, it helps bound the impact of any single identity, especially when there are a large number of possible actions for a resource. Other marginally-decreasing functions such as $\log(U_i)$ could be employed instead of $\sqrt{U_i}$. Other functions $f(U_i)$ may also be chosen, however, to reflect any other assumptions about how the risk of unused permissions is to be evaluated. As one other example, one might use $f=(U_i) = A \cdot U_i^\gamma$, where A is a pre-determined scaling factor and $\gamma \in (0, 1]$. Note that if $\gamma=1$, then $f(U_i)$ reduces to a simple linear function, which would reflect an assumption that additional unused permissions are to be considered no less a risk than the first.

By way of example, one data analysis done using a prototype of this embodiment of the invention determined that there were 135 possible actions for an S3 bucket, with an average of about 25 granted per identity (mean $\mu=25.5$, standard deviation $\sigma=25.3$). In that case, an identity with no unused actions would contribute 1 threat to the effective threat count (k), while an average identity that has not used any of its ~25 granted actions would contribute about 1+5=6 threats to k. An identity that has unused granted permissions for all possible actions on an S3 bucket would contribute about 12.6 threats to k, that is, an order of magnitude more than an identity with no unused permissions. Note that analyses of this type, with a sufficiently large, representative data set, may also make it possible to allow for pre-determined weights for known actions on known resources, such as for the number of actions associated with S3 buckets.

Both $I_i$ and $U_i$ may optionally be scaled to incorporate custom weights (e.g., weights 310 that may be inputted via customizer 118). For example, a low-risk action might be scaled by 0.5, while a high-risk action might be scaled by 2. Similarly, a low-risk identity may have a lower $I_i$ base threat value than a high-risk identity. Identity weights may optionally also incorporate known risk indicators, such as whether or not the identity is required to use multi-factor authentication (MFA) to log in—an identity using MFA may be deemed lower risk.

It would also be possible to assign per-identity $k_i$ values to compute and display a per-identity "risk contribution percentage" in the k value. For example, each $k_i$ could be normalized and expressed as a percentage. This would allow customers to sort by contribution to identify the riskiest identities of a resource, for example, to remediate first.

Base Security-Incident Probability ($\beta$)

Recall that $\beta$ is the probability of a security incident due to a single "threat". In order to yield a useful range of per-resource DRI scores across different values of $U_i$ the value of $\beta$ should be selected carefully. In a real environment, some spread of $S_P$ values is to be expected over [0,1] that isn't clustered in a narrow range like [0.90,0.99]. An analysis based on preliminary test data indicated that the average number of identities n with access to an S3 bucket is approximately a few hundred, with a maximum of a few thousand. For n=500, Table 1 shows the resulting $S_P$ values in [0,1] for various values of $\beta$ and $U_i$ with $I_i=1$.

TABLE 1

| $\beta$ | $U_i = 0$ | $U_i = 10$ | $U_i = 100$ |
|---|---|---|---|
| 0.0001 | 0.049 | 0.188 | 0.423 |
| 0.0005 | 0.221 | 0.647 | 0.936 |
| 0.0010 | 0.394 | 0.875 | 0.995 |
| 0.0050 | 0.918 | 0.999 | 0.999 |

Figure 6:
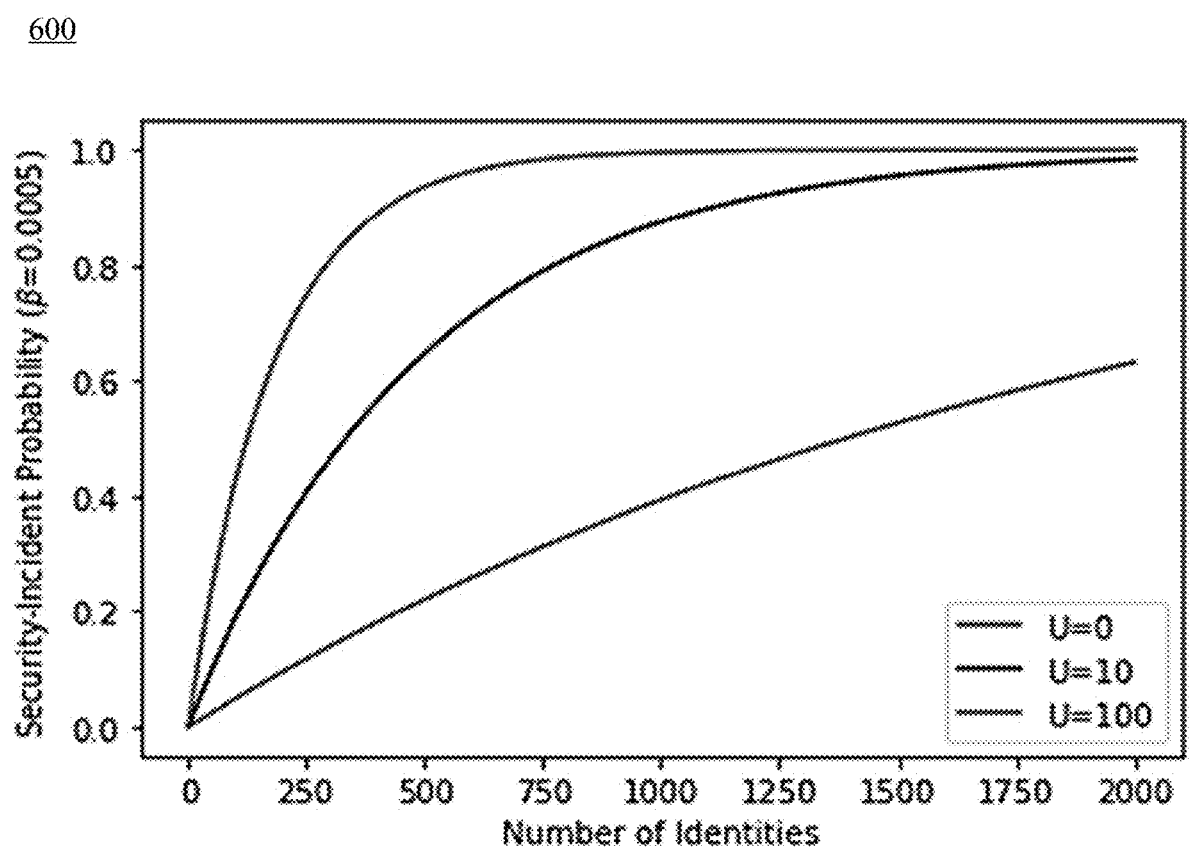
FIG. 6 shows an illustrative plot of security-incident probability values, in accordance with an example embodiment.

Over many realistic ranges of parameters, initial experimentation has indicated that $\beta$ values between 0.0001 and 0.002 yield reasonable $S_P$ values, while for $\beta=0.005$, the corresponding $S_P$ values are clustered too narrowly at the high end of the range. In the experiment, $\beta=0.0005$ appeared to be a plausible choice. This preliminary analysis shows, however, that known methods and analysis may be used to compile the data from which a system designer may choose a $\beta$ value appropriate to a given implementation. FIG. 6 is a plot 600 of $S_P$ values for $\beta=0.005$ and U=0 (the lower curve), 10 (the middle curve), and 100 (the upper curve).

Figure 7A:
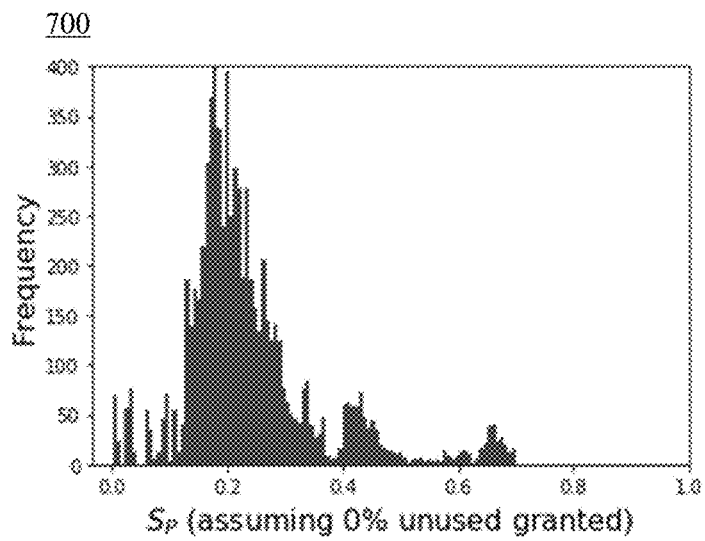
FIGS. 7A-7C show illustrative histograms generated for a production tenant's storage buckets, in accordance with an example embodiment.
Figure 7B:
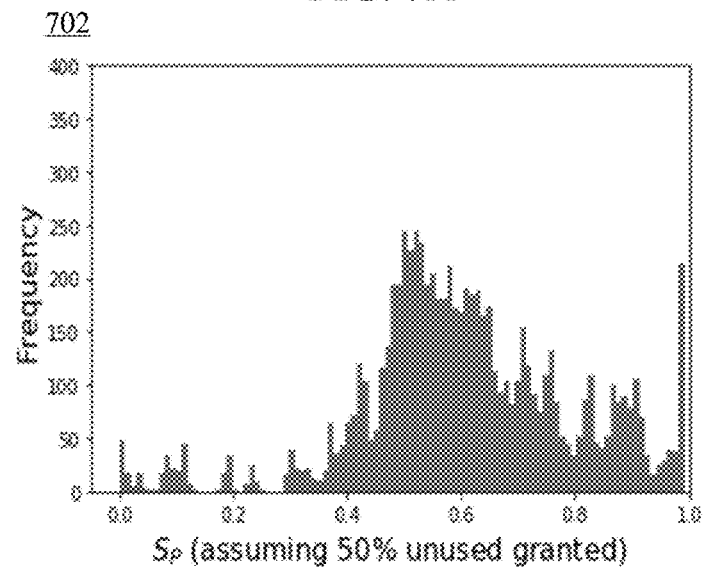
Figure 7C:
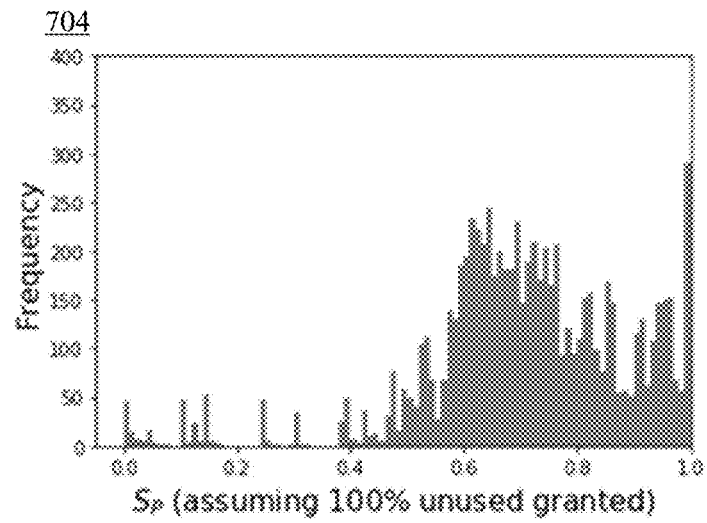

FIGS. 7A, 7B, and 7C are $S_P$ histograms 700, 702, 704, respectively, generated for a production tenant's 7500+ AWS S3 buckets, using the actual number of per-(identity, resource) grants, with $\beta=0.0005$, but with assumed distributions of unused granted permissions. The plots shown in FIGS. 7A, 7B, and 7C assume, respectively, 0%, 50% (uniform random over 0-100%), and 100% are unused.

With no unused permissions (histogram 700 of FIG. 7A), the average $S_P$ is 0.24 ($\sigma=0.12$); with 50% unused (histogram 702 of FIG. 7B), the average $S_P$ is 0.61 ($\sigma=0.19$); and with all permissions unused (histogram 704 of FIG. 7C), the average $S_P$ is 0.71 ($\sigma=0.19$). One may reasonably assume that real data will look somewhat similar to the FIG. 7B plot, but likely shifted a bit to the left or right depending on the actual distribution of unused granted permissions, which will naturally vary across tenants; the plots illustrated in FIG. 7A (no unused granted permissions) and FIG. 7C (all unused granted permissions) show possible extremes.

One may also tune $\beta$ based on measured values from a customer's environment in implementations in which there is no need or desire to avoid normalization or to make $S_P$ and DRI scores comparable across customer environments.

Security-Incident Impact

The consequences of different security incidents can be of different levels of severity. Moreover, different customers, or other factors, may affect the determination of how serious a security incident is. For example, a breach of customers' personal information may lead to severe damage to the reputation of an enterprise, as well as possibly serious monetary and even legal consequences. The legal consequences may in turn be more serious in jurisdictions such as the European Union, where the General Data Protection Regulation may apply. Yet another example might be an attack on the integrity of a bucket or database containing valuable information, such as corrupting specific values, or even wholesale modification or deletion of data. The effect of such incidents may be viewed as relating to the "sensitivity" of the affected data.

There are, however, other types of security incidents that do not directly involve any breach of any notion of data confidentiality, but that may nonetheless have a damaging effect that leads to serious consequences. As just one example, open ports or certain other system settings may in and of themselves increase the risk of hacking or other severe consequences, regardless of the probability of occurrence of exploitation. Still other security incidents may have nothing to do directly with any change of data, but may trigger significant and burdensome reporting and remediation requirements.

In short, every security incident may have some effect. The severity of such effects is referred to below as the impact of the security incident. Of course, the impact of a security incident may depend on more than one factor, such that "impact" may represent the cumulative effect of these factors. Below are described examples of different ways to quantify impact as a value $S_I$.

Embodiments may incorporate the concept of impact into DRI, based on factors such as, for example, explicit tags, inferences based on properties such as the use of a customer-managed encryption key, inferences based on scans of the data itself, etc. One example of the relevance of the concept of impact to the determination of DRI is data compromise of a highly-sensitive S3 bucket, which will in most cases be viewed as being more serious than a compromise of a less-sensitive bucket.

Any known method may be used to detect some chosen impact factors. One service that does so in the context of AWS is Amazon Macie®, which automatically finds and reports certain statistical data for a job. For example, Macie® can scan the data and determine what kind of sensitive/personal information it contains, if any, such as identity numbers (for example, a Social Security Numbers), credit card numbers, driver's license numbers, etc. It can also report the number of times that a job has run, a unique identifier for the job that produced the finding, the name, public access settings, encryption type, and other information about the respective affected S3 bucket and object. Macie® then provides an analysis log that reports the result of its sensitive data discovery process.

The probability of compromise based on factors such as the number of identities with access is, however, in most cases, separate from the impact of the compromise. In other words, the probability of a security incident will often be largely independent of the impact of that security incident. For example, the sensitivity for an S3 bucket computed by Macie® is intrinsic to the resource itself, but is independent of permissions for and activity on that resource.

Data Risk: Expected Security-Incident Impact

In some implementations, it may be enough to report security-incident probability and impact scores to customers separately. Here, however, an embodiment is described that provides a more sophisticated "combined" metric, that is, a single data-risk metric that incorporates both. One way to determine such a combined metric is to define data risk according to expected security-incident impact, which is a function, such as the product, of both terms, thus, security-incident probability times security-incident impact.

It would optionally also be possible to provide separate scores focused on such factors as confidentiality, integrity, and availability (CIA). For example, one could define a DRI-C score that considers only confidentiality threats associated with data leakage from read-only actions. See the later "CIA-Component Scores" section below for more details.

Impact-Dependent DRI Score

In the core DRI metric described above, DRI is a function of the security-incident probability $S_P$ alone. This is not the only choice. In other embodiments, the DRI values may be a function not only of security-incident probability, but also of the security-incident impact value $S_I$. Thus, in these embodiments:

$$DRI=DRI(S_P, S_I)$$

In one prototype, $S_I$ was used a multiplicative scaling factor for $S_P$, that is, $$DRI=S_P \times S_I$$

Other methods may also be chosen to reflect a dependence of DRI on $S_I$. $S_I$ could, for example, be used as a factor to scale k, or, equivalently, $S_I$ could be used as a fractional exponent in an expression such as $DRI=1-(1-S_P)^{S_I}$.

As mentioned above, the security impact value may itself be used to take into account more than one factor. Thus, in some embodiments, the system designer may choose $S_I=S_I$ $(S_{I1}, S_{I2}, \ldots, S_{In})$ such that n different security incident impact factors are consolidated, using any desired function, into the $S_I$ value.

In order to maintain DRI within a consistent range, it is then necessary to choose a range for $S_I$. Setting $S_I=1$ of course simply reduces DRI to the core metric, whereas any $S_I>1$ may cause DRI to exceed its maximum range value. On the other hand, setting $S_I<1$ would lead to the condition $\max(DRI)=S_I$, which reduces the possible range of DRI and could lead to inconsistencies relative to DRI scores that used a different $S_I$ value. This may be reasonable and acceptable for some uses, whereas in other cases it may be better to set $S_I$ low enough to make it harder to reach higher DRI scores, but not impossible. Especially in embodiments in which $S_I$ itself is comprised of more than one security incident impact factor $(S_I(S_{I1}, S_{I2}, \ldots, S_{In}))$, $S_I$ may optionally be normalized to fall into a known, bounded range such as [0, 1]. For example, normalization may be appropriate in embodiments in which $S_I$ is computed as the product of factors, each of which is in the range (0, 1], such that the product of the factors might otherwise "overwhelm" the contribution of the $S_P$ value and too greatly skew the DRI value.

One way to make the DRI value a function of incident impact without complicating the ability to maintain DRI values in a consistent range is to instead use $S_I$ as a scaling factor (e.g., one of weights 310) in the calculation of k, or the determination of β. Regardless of the manner in which $S_I$ is allowed to affect a final DRI value, if at all, embodiments may optionally specify a range for $S_I$ values, and then separately display $S_I$ values for resources, along with DRI scores. Separate display of impact values may in some cases be useful by allowing customers or administrators to more easily identify certain mischaracterizations of misconfigurations of resources or permissions.

For example, consider a storage-bucket resource that is left unencrypted. The system might see this and assign a low impact value $S_I$ to that resource on the assumption that the data in the bucket is not sensitive. This may, however, be a consequence of a customer misconfiguration—the bucket may in fact contain very sensitive data that should have been encrypted. As another example, a breach of an EU-based resource, which falls under the GDPR and contains personal data about EU citizens, may be more costly than one containing data about U.S. citizens. Making $S_I$ values separately available to customers, administrators, or other supervisory software routines may allow them to better identify the mischaracterization and take corrective action, such as changing the configuration setting of the resource and then setting the corresponding $S_I$ to a more appropriate higher value.

Quantifying Security-Incident Impact $S_I$

While security-incident probability quantifies how likely it is that a resource may be compromised, security-incident impact $S_I$ quantifies the effect of such a compromise. For example, a data compromise for an S3 bucket containing personally-identifiable customer information would likely be considered more impactful than a compromise of an S3 bucket containing only synthetic test data. Examples of methods for determining some types of security-incident impact factors include the use of explicit tags and inference. These examples are described in the following:

Explicit Tags

In some embodiments administrators, or those who administrators delegate or authorize, may be given the option to associate tags with resources, using labeling or tagging capabilities provided by the administrator of the scoring system, cloud providers like AWS, or configuration management databases (CMDBs). A mapping may in such cases be established and stored so that the identities may relate their custom tag strings to security-incident impact values in a specified range, such as $0 \leq S_I \leq 1$, for example, using simple tag $\Rightarrow S_I$ rules. Such user-provided information will in many cases be the accurate way to define the impact of a security incident—identities will often know best how severe an incident is in their particular situation. In implementations in which the DRI value is a function also of $S_I$, giving customers the ability to adjust $S_I$ also provides them another way to tune the overall range of DRI scores in their environment.

Inferred Impact

In the absence of customers tags, system designers may still make reasonable inferences regarding the importance of a data resource to help quantify the impact of a security incident. Several factors may be considered to help infer the security-incident impact of an S3 bucket (with analogous considerations for other types of resources). Some non-limiting examples of these factors may include:

- External Tools—Tools designed to discover sensitive data, such as services like Amazon Macie, may provide reliable information about the presence of sensitive data.
- Encryption Status—Data in an encrypted bucket may in some cases be considered to be probably more important than data in an unencrypted bucket. The use of a customer-managed key (CMK) also implies greater sensitivity than using an AWS-managed key.
- Resource Policy—A bucket with an explicitly-defined resource policy may be more sensitive than one without a resource policy.
- Accessibility—A bucket accessible from an EC2 (AWS Elastic Computing) instance with open SSH or RDP ports is likely less sensitive than others. More generally, a bucket with restrictive permissions defined for only a few identities is likely more sensitive than one for which a large number of identities have been granted permission.
- Data Volume—All other things being equal, a bucket containing more data may reasonably be considered more sensitive than one containing less of a similar type of data. For example, a compromise involving 1M records is typically more impactful than one involving only 100 records.

Classes

Optionally, identities and actions may be defined as members of "classes". A class could, for example, be defined as a set of identities based on some property (for example, all identities with MFA enabled, all contractors, etc.), or enumerated as a set (for example "Alice", "Bob", and "Carol") or as a set of actions, such as all read-only actions, or all actions that can delete data, etc. Classes could also be defined based on Boolean relationships, optionally including wildcard characters, etc. Class-based DRI weight rules may then also be defined and used to reflect qualitative factors, such as the privilege level of the identity itself.

Custom Weights

Custom weights (e.g., weights 310) may be assigned to individual identities, actions, or to classes of these. These and other weights could be either pre-computed and fixed, or made adjustable. Use of class-based weights may in many scenarios reduce the burden of specifying separate individual weights for each (identity, action) pair. As one example, the weight of a company CEO might be set to a highest value (or lowest, depending on how the metric is defined) whereas the weight for a data input operator might be set at the other extreme. Such weight rules would be employed in the computation of $S_P$, the security-incident probability component of DRI. These weights may then be applied to (identity, action) pairs associated with resource-centric DRI scores. In particular, an action-specific or (identity, action)-specific weight may be applied to $U_i$, and an identity-specific weight can be applied to $I_i$ during the computation of $S_P$. The mathematical effect of this is to make both $U_i$ and $I_i$ functions of other values, in particular, one or more weights.

As one example, $U_i$ might be computed to reflect such statistical usage patterns as the average or standard deviation of the times between consecutive actions, which may indicate the "regularity" of action by an identity—actions performed more regularly may in many cases be assumed to be carrying less risk than actions that are unusual for a particular identity. As another example, techniques such as the known "isolation forest" (see en.wikipedia.org/wiki/Isolation_forest) may be used to detect outliers or anomalies. Similarly, weights may be made functions of time, such that the longer an identity has been inactive, the higher risk the weight may reflect. The metric may also be computed for other similarly situated identities, such that statistically "deviant" behavior is weighted as having a higher risk level than otherwise. By storing a history of the metric for an identity, or for more than one identity, an administrator may then more easily detect anomalous behavior either in isolation (such as an unexpected "spike" in uses) or in comparison with other identities.

Concepts of weighting factors may also be combined. For example, if an identity's actions are monitored and it is discovered that they have regularly performed almost exclusively low-risk actions over a relatively long period, but suddenly initiates higher-impact actions, then a risk weight for this identity, such as a weight applied to $I_i$, may be increased.

Thus, one formula for $k_i$ (and the steps used to gather the data to compute it) may be extended to have the following form:

$$k_i = g(I_i, \vec{v}) + f(U_i, \vec{w})$$

where g is any chosen function according to which per-identity weight(s) $\vec{v}$ are applied and $\vec{w}$ are the per-identity weight(s) applied to granted, unused actions.

Even more generally, $k_i$ values may be determined not just per-identity, but per-(identity, action) pair, such that k may be expressed as:

$$k = k_{i,j} = g(I_i + \vec{v}) + f(U_i, \alpha_{i,j}, \vec{w})$$

with the weight $\alpha_{i,j}$ for the pair identity i and action j. Note that, instead of scaling k (per-identity $k_i$ or per-identity/action pair $k_{i,j}$) it would be possible to scale $\beta$ appropriately to achieve the same customization. Additional weighting could also be applied, for example, to weight granted actions even if used. Rather than per-identity weights, or weights of per-(identity, action) pairs, weighting could even be extended to finer granularity, such as by assigning weights per-(resource, identity, action) triples.

CIA-Component Scores

The ability to specify DRI weight rules enables support for multiple DRI metrics. In one embodiment, separate scores are provided for each component of the CIA triad—confidentiality (read-only actions), integrity (updates), and availability (deletes). For example, a DRI-C score weight rule could be used to specify that non-read-only actions should be ignored for this metric, which may be accomplished by using a weight of zero. The flexibility to define weight rules also makes it possible to measure other custom notions of data risk beyond confidentiality, integrity, and availability. DRI-C, DRI-I, and DRI-A scores could then be provided alongside the default overall DRI score.

$S_P$-$S_I$ Dependence

The formula DRI=$S_P \times S_I$ is in a form that may lead one to assume that $S_P$ and $S_I$ are uncorrelated, that is, statistically independent. In many implementations, this is a valid assumption, and in many others there is not enough information available to assume otherwise. In still other implementations, the given formula leads to DRI scores that are sufficient to enable realistic resource permissioning, allocation, and/or risk remediation decisions. It would be possible, however, to adjust the DRI formula to take into account either known correlations or other deliberate choices of values for security-incident probability and impact.

Consider, for example, an implementation in which there are only a few human users who are granted permission to access highly sensitive resources, and those users are better trained, use more secure systems, or are more closely monitored or otherwise constrained than other users, to reduce security risks. The much greater impact of a security incident for those resources may therefore affect the probability of an incident as well. Similarly, fewer processes are typically allowed to issue certain privileged instructions and those processes are likely to be more secure or run on more secure systems.

One way to allow for such dependence "indirectly" in DRI computation would be simply to adjust relevant weights accordingly. For example, the base per-identity threat value $I_i$ for a high-level security "clearance" or other highly trusted entity could be set lower than otherwise. Similarly, the overall $k_i$ for such entities could be set or scaled lower than otherwise.

Organization-Level DRI

Embodiments may also implement a DRI aggregation method, combining resource-DRI scores for individual resources in a defined group into an "organization-level" DRI score orgDRI. A "group" could be, for example, a set of resources having related functions, being controlled by or reserved for use by the same entity, operating within the same authorization system or organization, having been brought into service within some recent period, etc., in short, any defined set of resources across one more multiple systems. Group membership may also change over time, which may be accounted for by adjusting or restarting an accumulation period accordingly, changing the weights within DRI calculations, etc.

In general, individual per-resource DRI risk scores may be combined to yield an aggregate DRI risk score (e.g., by DRI aggregator 306). In some embodiments, only a subset of the individual resources are considered when generating the aggregate organization risk score, such as the N highest individual risk scores (e.g., "top 100"), or individual risk scores above a percentile threshold P (e.g., "top 25%"). Considering only a subset of individual resources may make the metric more robust, with less fluctuation as the number of entities varies over time. This technique may also help adjust for "expectation violations" when adding/removing resources or identities to an authorization system. For example, it would go against expectation that increasing a per-entity score would decrease the org-level score. Another method that may be used when the administrator notices that a DRI metric is changing in the "wrong" direction is to apply an explicit adjustment value to compensate for and avoid the violation. This adjustment value may then be stored and reduced in accordance with future metric changes that move in the "right" (expected) direction, so as to gradually eliminate the need for adjustment over time.

In some embodiments, high individual DRI scores may be weighted more heavily than low individual risk scores, such as by first applying a weighting function (linear or non-linear) to the raw individual scores before aggregating or combining them. Aggregation may be done by (possibly weighted) summation. Statistics, such as the average and/or standard deviation, of the scores may also be computed if desired.

One method for computing an aggregate DRI score would be to compute a weighted average, in which the DRI scores are themselves used as weights; thus, a resource with a DRI score of 50 would count five times as heavily in the aggregate weighted average as a resource whose DRI score is 10. Another method would be to compute the sum of the weighted per-resource DRI scores over all resources in the specified subset of resources, divided by the sum of the maximum possible organization risk (org-risk) contribution for each of these resources. The per-resource risk may be computed as:

$$\frac{resourceDRI}{maxDRI} \times weight,$$

where resourceDRI is the per-resource DRI in the chosen predetermined range [minDRI, maxDRI], where minDRI could, for example, be 0.0 and maxDRI could, for example, be 1.0, or 100, depending on what scaling is applied; and weight is a per-resource weight relative to others in the same group.

The maximum or g-risk (in particular, or gDRI) contribution of each resource could instead be a "risk-bucket"-based weight, for example, based on a high/medium/low (1/2/3) risk classification, or on any other more granular weighting scheme.

Aggregate metrics, in particular, those that are unnormalized, may be compared, for example, across different organizations, which may allow administrators to understand how well their organization is conforming to a security policy relative to a peer group consisting of other organizations. A peer group may optionally be defined based on some shared characteristics, such as the size, industry, or geographic location of each organization. In addition, a separate DRI score may be computed for each individual entity and each aggregation with respect to every instance of an organization's authorization systems, such as Amazon AWS®, Microsoft Azure™, VMware vSphere®, etc. These could then be combined to form a single metric spanning multiple authorization systems, such as by using a weighted average, where the weights may be based on the relative size or importance of the different authorization systems.

Presentation

In some embodiments, humans, such as system administrators, will wish to be able to interpret and review the computed metrics. One simple presentation might be for a single resource, over a single aggregation period. In such a case, the DRI score (e.g., DRI score 314) for the resource could simply be reported (e.g., reported by DRI reporter 304 as part of report 120) in numerical form, or in graphical form indicating either the numerical value or a position on any conventional form of scale. In implementations that store historical usage information, the current value could be presented along with past values, in tabular, numerical form, in the form of a time- or run-dependent graph, etc.

As another alternative, the DRI for a resource could be calculated both with and without weighting, with both being displayed for comparison. In some further embodiments, users may dynamically adjust one or more of the weights described herein and obtain updated scores in real-time or near-real time for any purpose (e.g., an exploration purpose to determine how weight changes affect generation of the DRI score). DRI values for groups may similarly be presented/displayed per-resource, along with aggregate values, also in any numerical or graphical form.

Collection

A software module is preferably included within each system for which usage data (e.g., data that may be included as part of resource access data 302) is to be monitored to gather usage data. In some cases, the modules may be identical, with one designated as a "central" module that collects data from the others and performs the DRI computations and reporting of result (e.g., DRI generation system 112 that includes DRI score generator 302 and/or DRI reporter 304); in other cases, all but the central module could be software modules that simply collect and communicate data to the central module. The usage data itself may be collected in any known manner, such as by examining cloud provider logs (for example, Amazon Cloud Trail), system logs (for example, syslog) of the respective computer systems, or by receiving information from other system software.

Processing

The various methods for computing a DRI described above provide resource-related metrics that may themselves be used for different purposes. One purpose may be simply informative, serving to guide administrators toward high-value policy changes (e.g., policy change 318). Moreover, reporting metrics for multiple organizations may provide a useful benchmark that allows administrators to assess the effectiveness of their security policies relative to peers.

Policy changes may also be automated, as a result of rules included along with the DRI routines. For example, if the risk associated with an identity becomes too high relative to a scale or threshold, then the system might automatically revoke permissions, or flag the administrator, who may then choose to take a remediation action relative to that identity to cause the "threat" presented by that identity to fall to an acceptable level. For example, for buckets with sensitive information, the system could automatically generate respective "Alert Triggers" when any threat threshold has been exceeded, or a threat event has been detected (e.g., alert 316).

Permissions for resources that have a relatively high security-incident impact score could, for example, be revoked first, with progressively less-impactful resources being revoked thereafter until the DRI score falls within an acceptable range. This would allow "risky" identities to continue to perform at least some actions until the cause of the unacceptably high risk score is determined and any necessary corrective action is taken.

IV. Example Computer System Implementation

IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 may be implemented in hardware, or hardware combined with one or both of software and/or firmware. For example, IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 may be implemented as computer program code/instructions configured to be executed in one or more processors and stored in a computer readable storage medium.

Alternatively, IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 may be implemented as hardware logic/electrical circuitry.

For instance, in an embodiment, one or more, in any combination, of IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
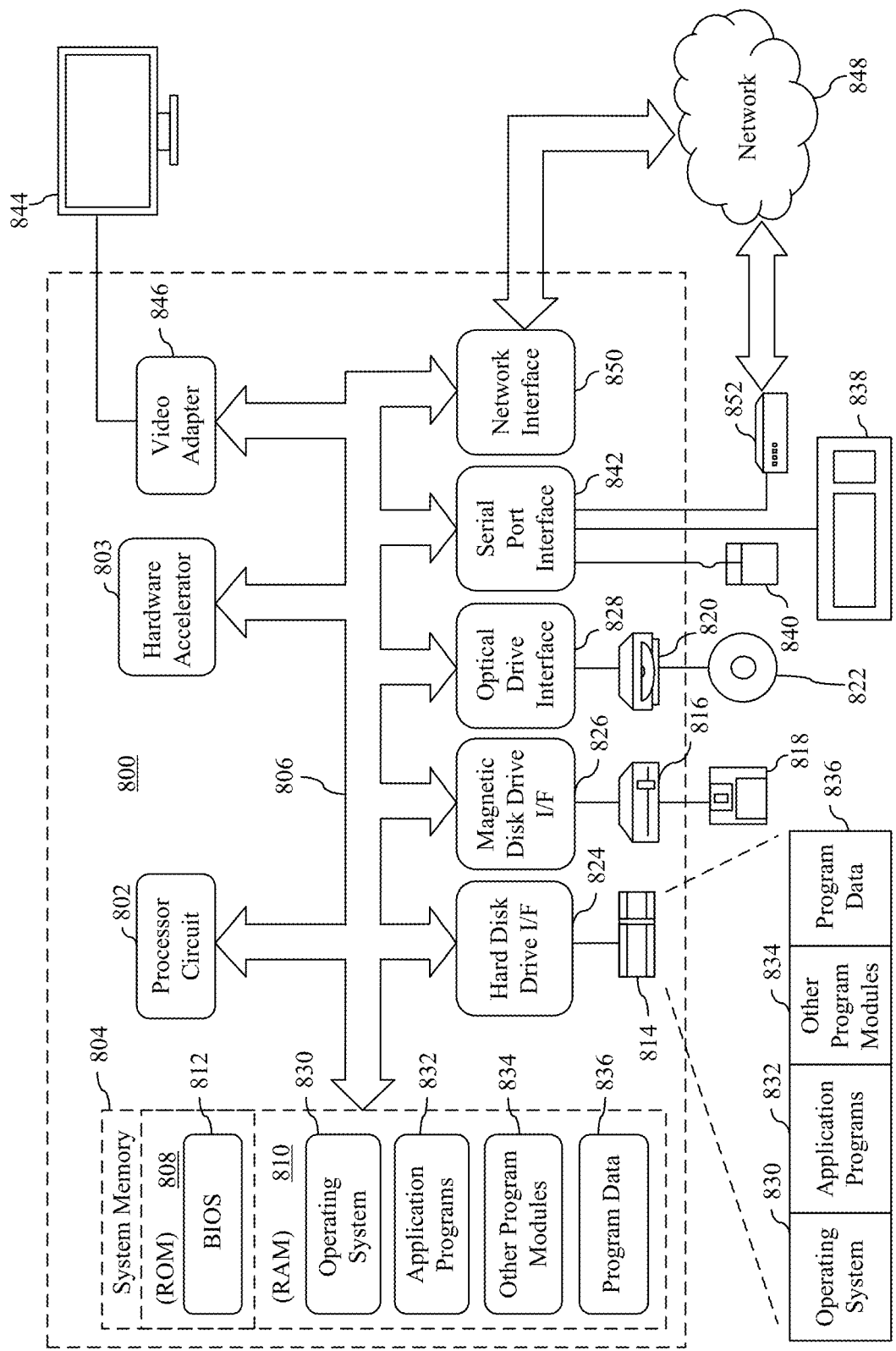
FIG. 8 is a block diagram of an example processor-based computer system that may be used to implement various embodiments.

FIG. 8 depicts an exemplary implementation of a computing device 800 in which embodiments may be implemented. For example, IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 (and/or any of the steps of flowcharts 200, 400, and 500 described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a hardware accelerator 803, a system memory 804, and a bus 806 that couples various system components including system memory 804 to processor circuit 802 and/or hardware accelerator 803. Processor circuit 802 and/or hardware accelerator 803 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 8030, application programs 8032, other programs 8034, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of IT system 102, server 110, data risk index generation system 112, computing device 114, administrator 116, customizer 118, DRI score generator 302, DRI reporter 304, DRI aggregator 306, flowchart 200, flowchart 400, and/or flowchart 500 and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A system for assigning a security risk score to a resource is disclosed herein. The system comprises: at least one processor circuit; and at least one memory that stores program code configured to be executed by the at least one processor circuit, the program code comprising: a data risk index (DRI) score generator configured to collect resource access data for a resource, and generate a DRI score for the resource based at least on the resource access data, the DRI score indicative of a level of risk that the resource will be compromised; and a DRI reporter configured to report, to an administrator, at least one of: the DRI score; an alert based at least on the DRI score; or a policy change for the resource based at least on the DRI score.

In one implementation of the foregoing system, the resource access data comprises permissions for each of a plurality of identities to perform an action on the resource.

In another implementation of the foregoing system, the DRI score is generated as a function of a probability that the resource will be compromised and an impact level of a security incident associated with the resource.

In another implementation of the foregoing system, the DRI score is generated as a function of a base probability of a security incident occurring due to a single threat and a number of effective threats.

In another implementation of the foregoing system, the DRI score comprises a combination of component scores, the component scores including at least one of a confidentiality score, a data integrity score, or an availability score for the resource.

In another implementation of the foregoing system, the DRI score generator is further configured to receive a weight associated with at least one of the resource, an identity permitted to access the resource, or an action that can be performed on the resource; and generate the DRI score for the resource based at least on the resource access data and the weight.

In another implementation of the foregoing system, the DRI score generator is further configured to generate a plurality of DRI scores, each DRI score corresponding to a different resource of an organization or perspective on risk; the system further comprises a DRI aggregator configured to aggregate the plurality of DRI scores to generate an aggregated DRI score; and the DRI reporter is configured to provide the aggregated DRI score to the administrator.

In another implementation of the foregoing system, the DRI aggregator is configured to aggregate the plurality of DRI scores to generate the aggregated DRI score by weighting each DRI score of the plurality of DRI scores with itself, and computing the aggregated DRI score based on the weighted DRI scores.

In another implementation of the foregoing system, the policy change comprises at least one of a change to a security policy, a granted but unused permission an identity has for the resource, an action performable on the resource, or a set of identities that have permission to access the resource.

A method for assigning a security risk score to a resource is disclosed herein. The method comprises: collecting resource access data for a resource; generating a DRI score for the resource based at least on the resource access data, the DRI score indicative of a level of risk that the resource will be compromised; reporting, to an administrator, at least one of: the DRI score; an alert based at least on the DRI score; or a policy change for the resource based at least on the DRI score.

In one implementation of the foregoing method, the resource access data comprises permissions for each of a plurality of identities to perform an action on the resource.

In another implementation of the foregoing method, the DRI score is generated as a function of a probability that the resource will be compromised and an impact level of a security incident associated with the resource.

In another implementation of the foregoing method, the DRI score comprises a combination of component scores, the component scores including at least one of a confidentiality score, a data integrity score, or an availability score for the resource.

In another implementation of the foregoing method, the method further comprises: receiving a weight associated with at least one of the resource, an identity permitted to access the resource, or an action that can be performed on the resource; and generating the DRI score for the resource based at least on the resource access data and the weight.

In another implementation of the foregoing method, the method further comprises: generating a plurality of DRI scores, each DRI score corresponding to a different resource of an organization or perspective on risk; aggregating the plurality of DRI scores to generate an aggregated DRI score; and providing the aggregated DRI score to the administrator.

In another implementation of the foregoing method, the policy change comprises at least one of a change to a security policy, a granted but unused permission an identity has for the resource, an action performable on the resource, or a set of identities that have permission to access the resource.

A computer-readable storage medium is disclosed herein. The computer-readable storage medium has program instructions recorded thereon that, when executed by at least one processor of a computing device, perform a method, the method comprising: collecting resource access data for a resource; generating a DRI score for the resource based at least on the resource access data, the DRI score indicative of a level of risk that the resource will be compromised; and reporting, to an administrator, at least one of: the DRI score; an alert based at least on the DRI score; or a policy change for the resource based at least on the DRI score.

In one implementation of the foregoing computer-readable storage medium, the method further comprises: receiving a weight associated with at least one of the resource, an identity permitted to access the resource, or an action that can be performed on the resource; and generating the DRI score for the resource based at least on the resource access data and the weight.

In another implementation of the foregoing computer-readable storage medium, the method further comprises: generating a plurality of DRI scores, each DRI score corresponding to a different resource of an organization or perspective on risk; aggregating the plurality of DRI scores to generate an aggregated DRI score; and providing the aggregated DRI score to the administrator.

In another implementation of the foregoing computer-readable storage medium, the policy change comprises at least one of a change to a security policy, a granted but unused permission an identity has for the resource, an action performable on the resource, or a set of identities that have permission to access the resource.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for assigning a security risk score to a resource, comprising:
   a processor circuit; and
   a memory that stores program code that is executed by the processor circuit to cause the system to:
      receive, in a computing device, resource access data over a network for the resource;
      receive a weight associated with an action that can be performed on the resource;
      generate a data risk index (DRI) score for the resource based at least on the resource access data and the weight, the DRI score indicative of a level of risk that the resource will be compromised; and
      provide, to a user interface communicatively coupled to the computing device via the network, a report that comprises at least one of:
         the DRI score;
         an alert based at least on the DRI score; or
         a policy change for the resource based at least on the DRI score,
      wherein the user interface comprises an interactive element to interact with the report.

2. The system of claim 1, wherein the resource access data comprises permissions for an identity to perform an action on the resource.

3. The system of claim 1, wherein the DRI score is generated as a function of a probability that the resource will be compromised and an impact level of a security incident associated with the resource.

4. The system of claim 1, wherein the DRI score is generated as a function of a base probability of a security incident occurring due to a single threat and a number of effective threats.

5. The system of claim 1, wherein the DRI score comprises a combination of component scores, the component scores including at least one of a confidentiality score, a data integrity score, or an availability score for the resource.

6. The system of claim 1, wherein the program code that is executed by the processor circuit further causes the system to:
   receive a second weight associated with at least one of the resource or an identity permitted to access the resource; and
   generate the DRI score for the resource based at least on the resource access data and the second weight.

7. The system of claim 1, wherein the program code that is executed by the processor circuit further causes the system to:
   generate a plurality of DRI scores corresponding to different resources of an organization or perspective on risk; and
   aggregate the plurality of DRI scores to generate an aggregated DRI score, wherein the aggregated DRI score is included in the report.

8. The system of claim 7, wherein the program code that is executed by the processor circuit further causes the system to generate the aggregated DRI score by:
   multiplying the DRI score with itself to generate a weighted DRI score; and
   computing the aggregated DRI score based at least on the weighted DRI score.

9. The system of claim 1, wherein the policy change comprises at least one of a change to a security policy, a granted but unused permission an identity has for the resource, an action performable on the resource, or a set of identities that have permission to access the resource.

10. A method for assigning a security risk score to a resource, comprising:
    receiving, in a computing device, resource access data over a network for the resource;
    receiving a weight associated with an action that can be performed on the resource;
    generating a data risk index (DRI) score for the resource based at least on the resource access data and the weight, the DRI score indicative of a level of risk that the resource will be compromised; and
    provide, to a user interface communicatively coupled to the computing device via the network, a report that comprises at least one of:
       the DRI score;
       an alert based at least on the DRI score; or
       a policy change for the resource based at least on the DRI score,
    wherein the user interface comprises an interactive element to interact with the report.

11. The method of claim 10, wherein the resource access data comprises permissions for an identity to perform an action on the resource.

12. The method of claim 10, wherein the DRI score is generated as a function of a probability that the resource will be compromised and an impact level of a security incident associated with the resource.

13. The method of claim 10, wherein the DRI score comprises a combination of component scores, the component scores including at least one of a confidentiality score, a data integrity score, or an availability score for the resource.

14. The method of claim 10, further comprising:
    receiving a second weight associated with at least one of the resource or an identity permitted to access the resource; and
    generating the DRI score for the resource based at least on the resource access data and the second weight.

15. The method of claim 10, further comprising:
    generating a plurality of DRI scores corresponding to different resources of an organization or perspective on risk; and
    aggregating the plurality of DRI scores to generate an aggregated DRI score, wherein the aggregated DRI score is included in the report.

16. The method of claim 10, wherein the policy change comprises at least one of a change to a security policy, a granted but unused permission an identity has for the resource, an action performable on the resource, or a set of identities that have permission to access the resource.

17. A computer-readable storage medium having program instructions recorded thereon that, when executed by at least one processor of a computing device, perform a method, the method comprising:
    receiving, in a computing device, resource access data over a network for the resource;
    receiving a weight associated with an action that can be performed on the resource;
    generating a data risk index (DRI) score for the resource based at least on the resource access data and the weight, the DRI score indicative of a level of risk that the resource will be compromised; and
    provide, to a user interface communicatively coupled to the computing device via the network, a report that comprises at least one of:
       the DRI score;
       an alert based at least on the DRI score; or a policy change for the resource based at least on the DRI score wherein the user interface comprises an interactive element to interact with the report.

18. The computer-readable storage medium of claim 17, further comprising:

receiving a second weight associated with at least one of the resource or an identity permitted to access the resource; and generating the DRI score for the resource based at least on the resource access data and the second weight.

19. The computer-readable storage medium of claim 17, further comprising:

generating a plurality of DRI scores corresponding to different resources of an organization or perspective on risk; and aggregating the plurality of DRI scores to generate an aggregated DRI score, wherein the aggregated DRI score is included in the report.

20. The computer-readable storage medium of claim 17, wherein the policy change comprises at least one of a change to a security policy, a granted but unused permission an identity has for the resource, an action performable on the resource, or a set of identities that have permission to access the resource.

* * * * *